(12) United States Patent
Horiuchi et al.

(10) Patent No.: US 9,964,888 B2
(45) Date of Patent: May 8, 2018

(54) IMAGE FORMING APPARATUS

(71) Applicant: CANON KABUSHIKI KAISHA, Tokyo (JP)

(72) Inventors: Izuru Horiuchi, Tokyo (JP); Yoichi Takikawa, Kawasaki (JP); Jun Hirabayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/624,379

(22) Filed: Jun. 15, 2017

(65) Prior Publication Data

US 2017/0285511 A1    Oct. 5, 2017

Related U.S. Application Data

(63) Continuation of application No. 14/785,290, filed as application No. PCT/JP2014/058853 on Mar. 27, 2014, now Pat. No. 9,703,230.

(30) Foreign Application Priority Data

Apr. 18, 2013   (JP) .................. 2013-087877

(51) Int. Cl.
| | | |
|---|---|---|
| G03G 15/04 | (2006.01) |
| G03G 15/043 | (2006.01) |
| G02B 26/12 | (2006.01) |
| B41J 2/47 | (2006.01) |

(52) U.S. Cl.
CPC ............ *G03G 15/043* (2013.01); *B41J 2/471* (2013.01); *G02B 26/127* (2013.01); *G03G 15/04072* (2013.01)

(58) Field of Classification Search
CPC .................................................... G03G 15/043
USPC ............................................................ 399/4
See application file for complete search history.

(56) References Cited

U.S. PATENT DOCUMENTS 7,508,542 B2 *   3/2009   Kirita ................. G06K 15/1223
                                                                        358/1.9
2008/0225905 A1   9/2008   Inagawa

FOREIGN PATENT DOCUMENTS

| CN | 1696761 A | 11/2005 |
| CN | 101311839 A | 11/2008 |
| CN | 102629091 A | 8/2012 |

* cited by examiner

*Primary Examiner* — Quana M Grainger
(74) *Attorney, Agent, or Firm* — Canon USA Inc., IP Division

(57) ABSTRACT

An incidence angle of laser light with respect to a photosensitive member in a main-scanning direction is different depending on an exposure position. Hence, the spot shape of the laser light on the photosensitive member is different in the main-scanning direction. A filter coefficient is changed in the main-scanning direction, and image data is corrected with the filter coefficient.

5 Claims, 21 Drawing Sheets

FIG. 5
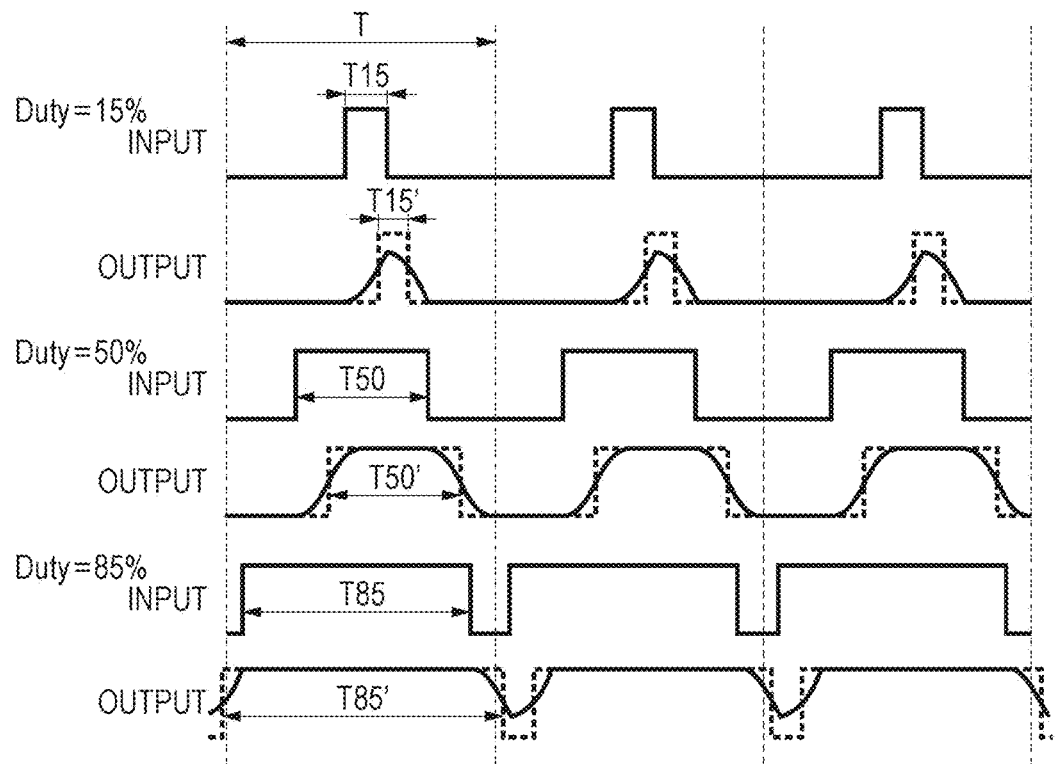
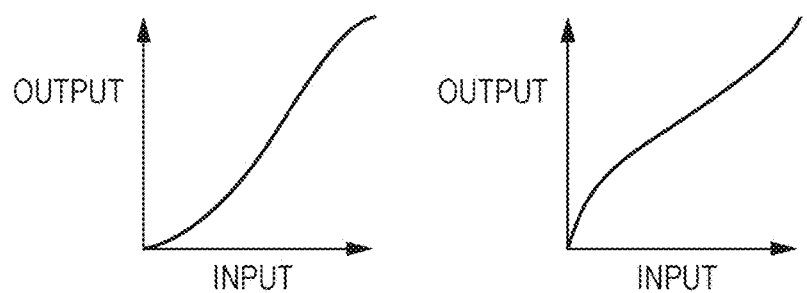

FIG. 6
(a)
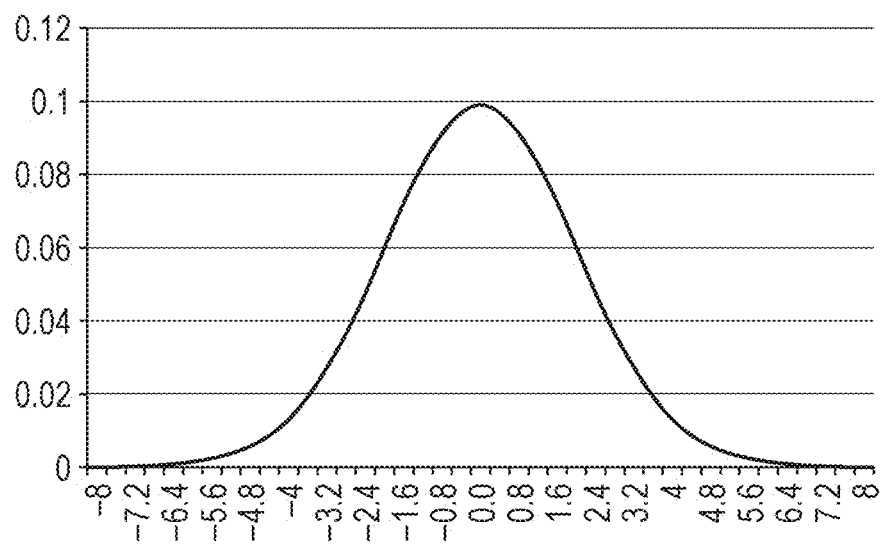
(b)
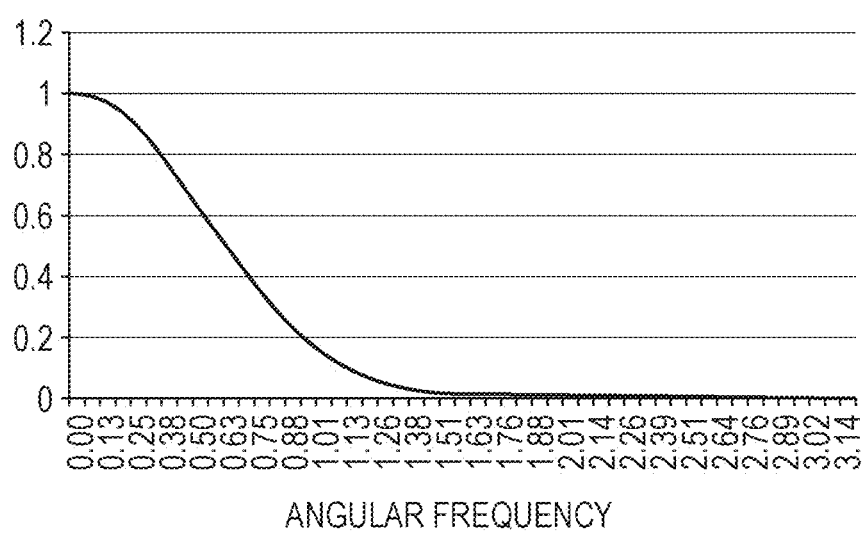
ANGULAR FREQUENCY

FIG. 10

| K(-7, -7) | K(-6, -7) | ... | K(-1, -7) | K(0, -7) | K(1, -7) | | K(6, -7) | K(7, -7) |
|---|---|---|---|---|---|---|---|---|
| K(-7, -6) | K(-6, -6) | | K(-1, -6) | K(0, -6) | K(1, -6) | | K(6, -6) | K(7, -6) |
| ⋮ | ⋱ | | ⋮ | | | ⋰ | | ⋮ |
| K(-7, -1) | K(-6, -1) | | K(-1, -1) | K(0, -1) | K(1, -1) | | K(6, -1) | K(7, -1) |
| K(-7, 0) | K(-6, 0) | ... | K(-1, 0) | K(0, 0) | K(1, 0) | ... | K(6, 0) | K(7, 0) |
| K(-7, 1) | K(-6, 1) | | K(-1, 1) | K(0, 1) | K(1, 1) | | K(6, 1) | K(7, 1) |
| ⋮ | ⋰ | | ⋮ | | | ⋱ | | ⋮ |
| K(-7, 6) | K(-6, 6) | | K(-1, 6) | K(0, 6) | K(1, 6) | | K(6, 6) | K(7, 6) |
| K(-7, 7) | K(-6, -7) | | K(-1, 7) | K(0, 7) | K(1, 7) | | K(6, 7) | K(7, 7) |

FIG. 12
(a)
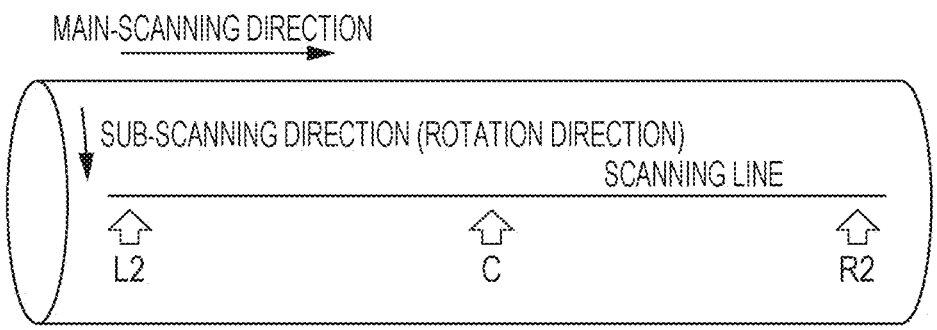
(b)
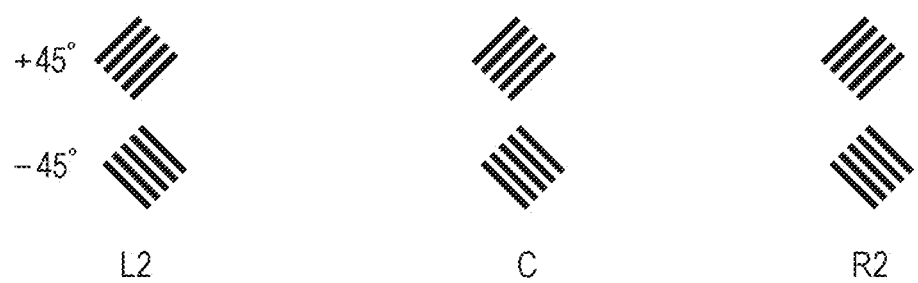

FIG. 13
(a)
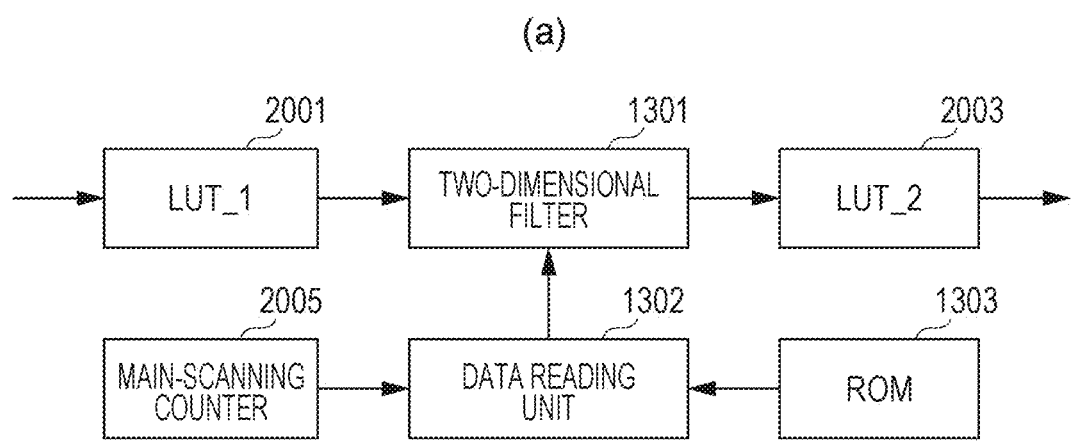
(b)
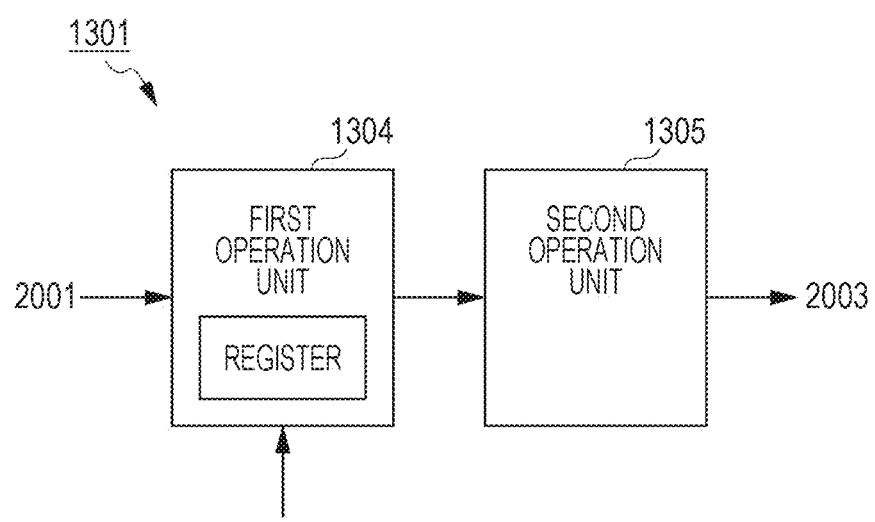

FIG. 16
(a)
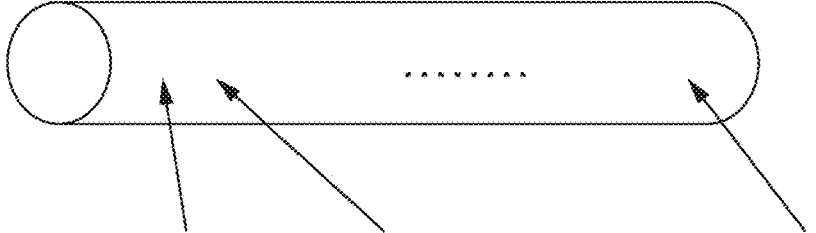
(b)
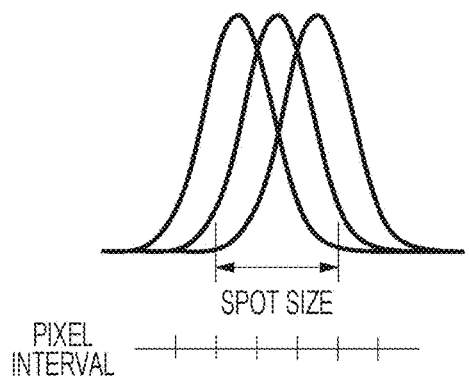
(c)
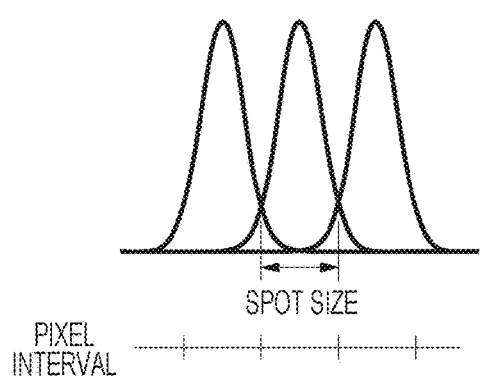

FIG. 18
(a)
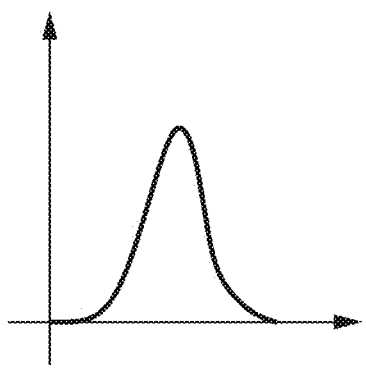
CASE OF DEFOCUSING
BY SMALL AMOUNT
(b)
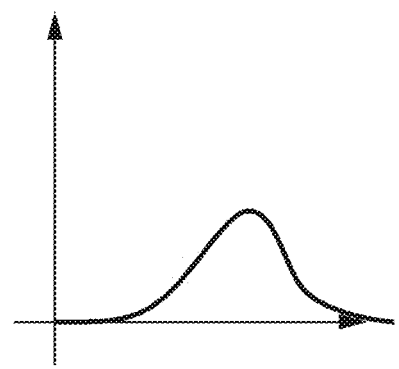
CASE OF DEFOCUSING
BY LARGE AMOUNT FIG. 21
(a)
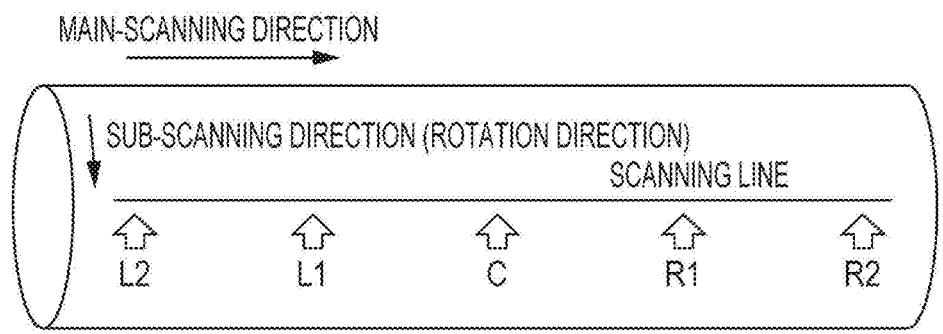
(b)
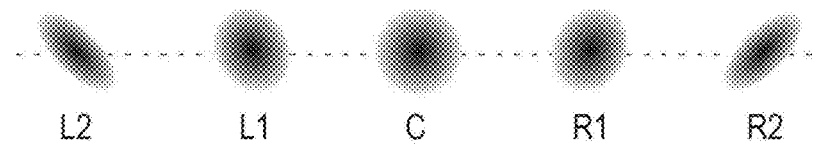
(c)
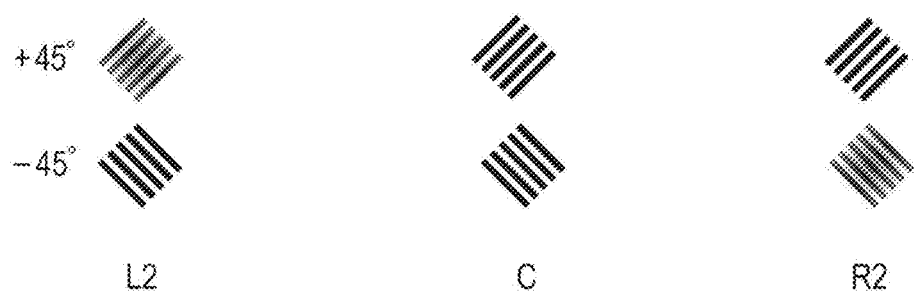

IMAGE FORMING APPARATUS

CROSS-REFERENCE TO RELATED APPLICATIONS

This application is a Continuation of co-pending U.S. patent application Ser. No. 14/785,290, filed Oct. 16, 2015, which is a U.S. national stage application of International Patent Application No. PCT/JP2014/058853 with international filing date Mar. 27, 2014 and which claims foreign priority benefit of Japanese patent application No. 2013-087877 filed Apr. 18, 2013, all of which are hereby incorporated by reference herein in their entirety.

TECHNICAL FIELD

The present invention relates to an electrophotographic image forming apparatus, such as a digital copier, a multi-function device, or a laser printer.

BACKGROUND ART

An electrophotographic image for apparatus forms an image by developing an electrostatic latent image formed on a photosensitive member with a toner. The image forming apparatus includes an optical scanning device. An electrostatic latent image is formed on the photosensitive member by scanning with laser light emitted from the optical scanning device on the basis of image data. The optical scanning device includes a rotatable polygonal mirror that deflects laser light emitted from a light source, and an optical member such as a lens or a mirror that guides the laser light deflected by the rotatable polygonal mirror onto the photosensitive member.

The photosensitive characteristics of the surface of the photosensitive member slightly vary depending on the position of the surface of the photosensitive member. Even if the photosensitive member is exposed to laser light with the same light quantity, the density of an output image may be uneven due to the unevenness of the photosensitive characteristics of the surface of the photosensitive member.

To address the problem, PTL 1 discloses an image forming apparatus that corrects image data in accordance with a scanning position (exposure position) with laser light on a photosensitive member. With the image forming apparatus described in PTL 1, the unevenness of the density of the output image due to the unevenness of the photosensitive characteristics of the surface of the photosensitive member can be restricted.

CITATION LIST

Patent Literature

PTL 1: Japanese Patent Laid--Open No. 2010-131989

SUMMARY OF INVENTION

Technical Problem

However, the electrophotographic image forming apparatus has a problem in addition to the aforementioned problem. As shown in FIG. 21, the incident angle of the laser light with respect to the photosensitive member is different depending on the exposure position in a direction in which the laser light scans the photosensitive member (main-scanning direction) shown in FIG. 21(a). Owing to this, the spot shape of the laser light on the photosensitive member is different depending on the position in the main-scanning direction. Also, the spot shape of the laser light on the photosensitive member may not be uniform in the main-scanning direction depending on the arrangement accuracy of the lens or mirror that guides the laser light to the photosensitive member. Due to the unevenness of the spot shape of the laser light in the main-scanning direction, it may be difficult to obtain a good image. In particular, in a case in which an image is formed at a screen angle inclined to the main-scanning direction, for example, as indicated by +45' of L2 and −45° of R2 in FIG. 21(c), the image quality of the output image may be decreased due to the different orientations of the sport shapes of the laser light and the different screen angles.

Solution to Problem

The present invention is made in light of the above-described problems, and there is provided an image forming apparatus including a light source configured to emit light beam for exposing a photosensitive member to light; deflecting means for deflecting the light beam so that the light beam scans the photosensitive member; optical means for guiding the light beam deflected by the deflecting means to the photosensitive member; data generating means for generating pixel data corresponding to each pixel included in an output image; outputting means for outputting correction data for correcting unevenness of a potential distribution of an electrostatic latent image centered at a target pixel formed on the photosensitive member by exposure of the photosensitive member to the light beam in a scanning direction in which the light beam scans the photosensitive member, the correction data corresponding to a position of the target pixel in the scanning direction, the outputting unit outputting the correction data being indicative of an amount of change in potential at the position of the target pixel caused by exposure of a surrounding pixel located around the target pixel to the light beam; correcting means for correcting pixel data of the target pixel on the basis of the correction data and the pixel data of the target pixel; and control means for controlling the light source on the basis of the pixel data of the target pixel corrected by the correcting means, to form the target pixel. Also, there is another image forming apparatus including a light source configured to emit light beam for exposing a photosensitive member to light; deflecting means for deflecting the light beam so that the light beam scans the photosensitive member; optical means for guiding the light beam deflected by the deflecting means to the photosensitive member; data generating means for generating pixel data corresponding to each pixel included in an output image; outputting means for outputting correction data for correcting unevenness of a potential distribution of an electrostatic latent image centered at a target pixel formed on the photosensitive member by exposure of the photosensitive member to the light beam in a scanning direct on in which the light beam scans the photosensitive member, the correction data being indicative of an amount of change in potential at a pixel position of a surrounding pixel surrounding the target pixel caused by exposure of the target pixel; correcting means for correcting pixel data of the target pixel, and pixel data of the target pixel corrected on the basis of the correction data; and control means for controlling the light source on the basis of the pixel data corrected by the correction means, to form the target pixel.

ADVANTAGEOUS EFFECTS OF INVENTION

With the invention, the decrease in image quality due to the unevenness of the spot shape of the laser light in the main-scanning direction can be restricted by correcting the image data with use of the two-dimensional filter.

BRIEF DESCRIPTION OF DRAWINGS

FIG. 5 provides explanatory views of LUT.

FIG. 6 illustrates a two-dimensional gauss distribution diagram and a Fourier transform result of the two-dimensional gauss distribution.

FIG. 10 is a schematic illustration of filter coefficients.

FIG. 12 illustrates as effect provided by a two-dimensional filter.

FIG. 13 provides control block diagrams of an image processor included in an image for apparatus according to a second embodiment.

FIG. 16 illustrates an example of filter coefficients stored in a ROM of the image forming apparatus according to the second embodiment.

FIG. 18 illustrates a change in spot shape in accordance with defocusing.

FIG. 21 illustrates an exposure distribution on a photosensitive drum in an image forming apparatus of related art.

DESCRIPTION OF EMBODIMENTS

First Embodiment

An embodiment of an electrophotographic color image forming apparatus as an example is described below. It is to be noted that the embodiment is not limited to the color image forming apparatus, and may be a monochrome image forming apparatus.

Figure 1:
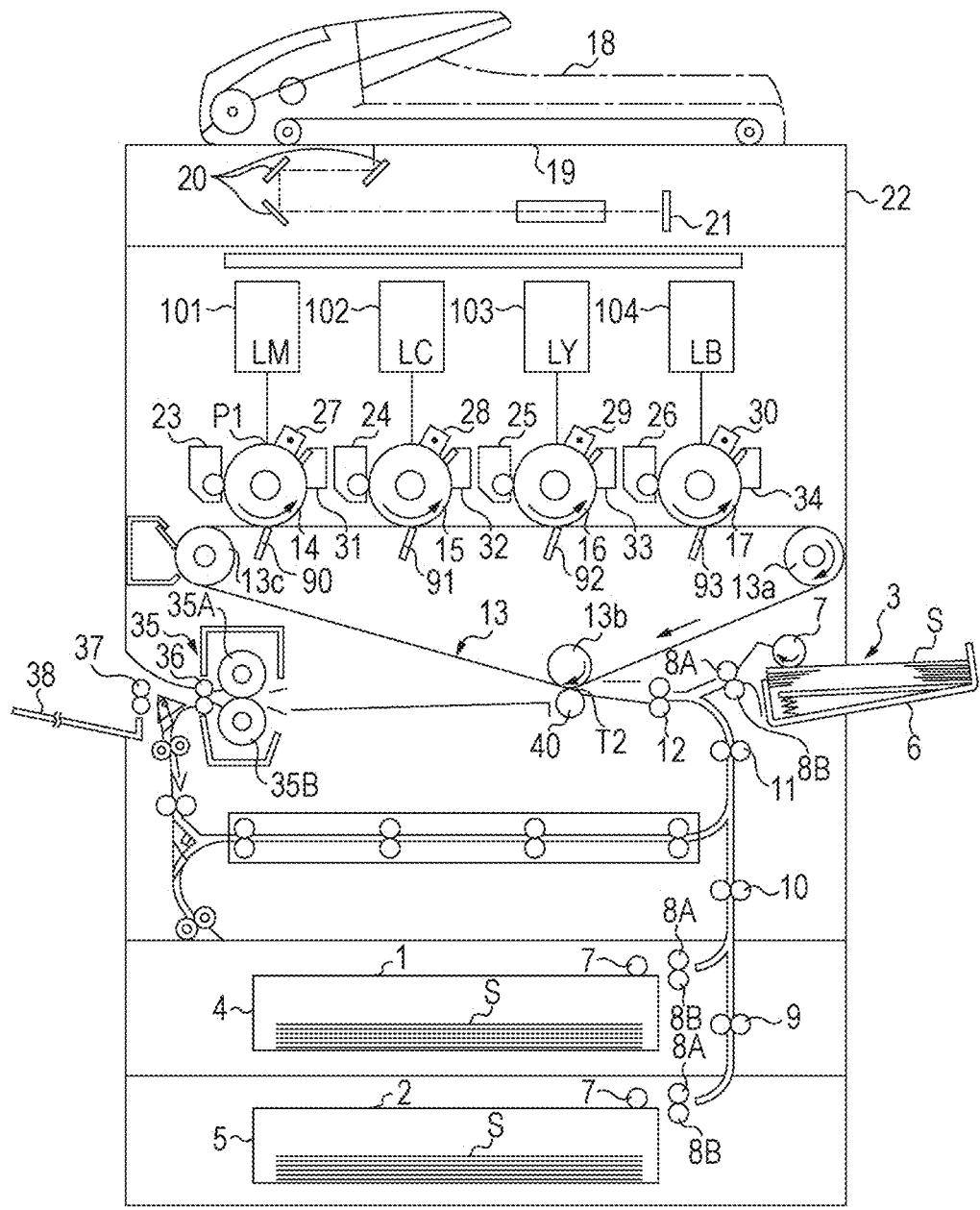
FIG. 1 is a schematic cross-sectional view of an image forming apparatus.

FIG. 1 is a schematic cross-sectional view of the color image forming apparatus. The color image forming apparatus shown in FIG. 1 includes a reading device 22. The reading device 22 includes an ADF 18 (Auto Document Feeder), a document plate 19, a reflecting mirror group 20, and an image sensor 21. The ADF 18 conveys a document set at a predetermined position to the document plate 19. The reading device 22 includes an illuminating device (not shown). The illuminating device irradiates a document conveyed to the document plate 19 from the ADF 18 or a document placed on the document plate 19 with light. The light reflected from the document is guided by the reflecting mirror group 20 to the image sensor 21. The image sensor 21 includes a CCD being a photoelectric conversion element. The CCD generates read image data receiving the reflected light.

The image forming apparatus according to this embodiment includes two cassette paper feed portions 1 and 2, and a single manual paper feed portion 3. Recording sheets S (recording media) are fed selectively from the paper feed portions 1, 2, and 3. The recording sheets S are stacked in a cassette 4 or 5, or on a manual feed tray 6 of the paper feed portion 1, 2, or 3. The recording sheets S are successively picked up by a pickup roller 7 provided at each of the respective paper feed portions. Then, among the recording sheets S picked up by the pickup roller 7, a recording sheet S at the top of a bundle of recording sheets is sent by a separation roller pair 8 including a feed roller 8A and a retard roller 8B to a registration roller pair 12. In this case, a recording sheet S fed from one of the cassettes 4 and 5 arranged at large distances from the registration roller pair 12 is relayed by a plurality of conveying roller pairs 9, 10, and 11 and then is sent to the registration roller pair 12.

When the leading edge of the recording sheet S sent to the registration roller pair 12 contacts a nip of the registration roller pair 12 and forms a predetermined loop, the movement of the recording sheet S is temporarily stopped. With the formation of this loop, a skew state of the recording sheet S is corrected.

A long intermediate transfer belt (endless belt) 13 being an intermediate transfer member is arranged downstream of the registration roller pair 12. The intermediate transfer belt 13 is wound around a driving roller 13a, a second transfer opposite roller 13b, and a tension roller 13c with a tension, so as to have a substantially triangular shape in cross-sectional view. The intermediate transfer belt 13 rotates clockwise in the drawing. A plurality of photosensitive drums 14, 15, 16, and 17 are arranged on an upper surface of a horizontal portion of the intermediate transfer belt 13 along the rotation direction of the intermediate transfer belt 13. The photosensitive drums 14, 15, 16, and 17 are photosensitive members that respectively bear toner images of different colors.

The photosensitive drum 14 at the most upstream side in the intermediate-transfer-belt rotation direction bears a toner image of magenta color, the next photosensitive drum 15 bears a toner image of cyan color, the next photosensitive drum 16 bears a toner image of yellow color, and the photosensitive drum 17 at the most downstream side bears a toner image of black color.

Reference signs LM, LC, LY, LB denote optical scanning devices (laser scanners) respectively corresponding to the photosensitive drums 14, 15, 16, and 17.

Next, an image forming process is described. The most upstream photosensitive drum 14 is exposed to laser light LM based on image data of a magenta component. When the laser light LM scans the photosensitive drum 14, an electrostatic latent image is formed on the photosensitive drum 14. This electrostatic latent image is developed with a toner of magenta color supplied from a developing unit 23.

The photosensitive drum 15 is exposed to laser light LC based on image data of a cyan component. When the photosensitive drum 15 is exposed to the laser light LC, an electrostatic latent image is formed on the photosensitive drum 15. This electrostatic latent image is developed with a toner of cyan color supplied from a developing unit 24.

The photosensitive drum 16 is exposed to laser light LY based on image data of a yellow component. When the photosensitive drum 16 is exposed to the laser light LY, an electrostatic latent image is formed on the photosensitive drum 16. This electrostatic latent image is developed with a toner of yellow color supplied from a developing unit 25.

The photosenstive drum 17 is exposed to laser light LB based on image data of a black component. When the photosensitive drum 17 is exposed to the laser light LB, an electrostatic latent image is formed on the photosensitive drum 17. This electrostatic latent image is developed with a toner of black color supplied from a developing unit 26.

First charging units 27 to 30 for electrically uniformly charging the respective photosensitive drums 14 to 17, cleaners 31 to 34 for removing toners adhering on the photosensitive drums 14 to 17 after transfer of the toner images, and other members are arranged around the respective photosensitive drums 14 to 17.

The toner images on the photosensitive drums pass through transfer portions between the intermediate transfer belt 13 and the photosensitive drums 14 to 17. The toner images on the respective photosensitive drums are transferred on the intermediate transfer belt 13 by a transfer bias applied by transfer charging units 90 to 93.

Then, the registration roller pair 12 starts rotating with regard to a timing at which the toner images on the intermediate transfer belt 13 are aligned with the leading edge of the recording sheet. The registration roller pair 12 conveys the recording sheet S to a second transfer portion T2 between a second transfer roller 40 and a second transfer opposite roller 13b. At the second transfer portion T2, the toner images on the intermediate transfer belt 13 are transferred on the recording sheet S by a transfer bias applied to the second transfer roller 40.

The recording sheet S passing through the second transfer portion T12 is sent to a fixing device 35 by the intermediate transfer belt 13. Then, in a process in which the recording sheet S passes through a nip portion formed by a fixing roller 35A and a pressing roller 35B in the fixing device 35, the toner images on the recording sheet S are heated by the fixing roller 35A, pressed by the pressing roller 35B, and hence fixed to the recording sheet surface. The recording sheet S after the recording sheet S passes through the fixing device 35 and is applied with the fixing processing is sent by a conveying roller pair 36 to a discharge roller pair 37, and is further discharged on a discharge tray 38 arranged outside the apparatus.

Figure 2:
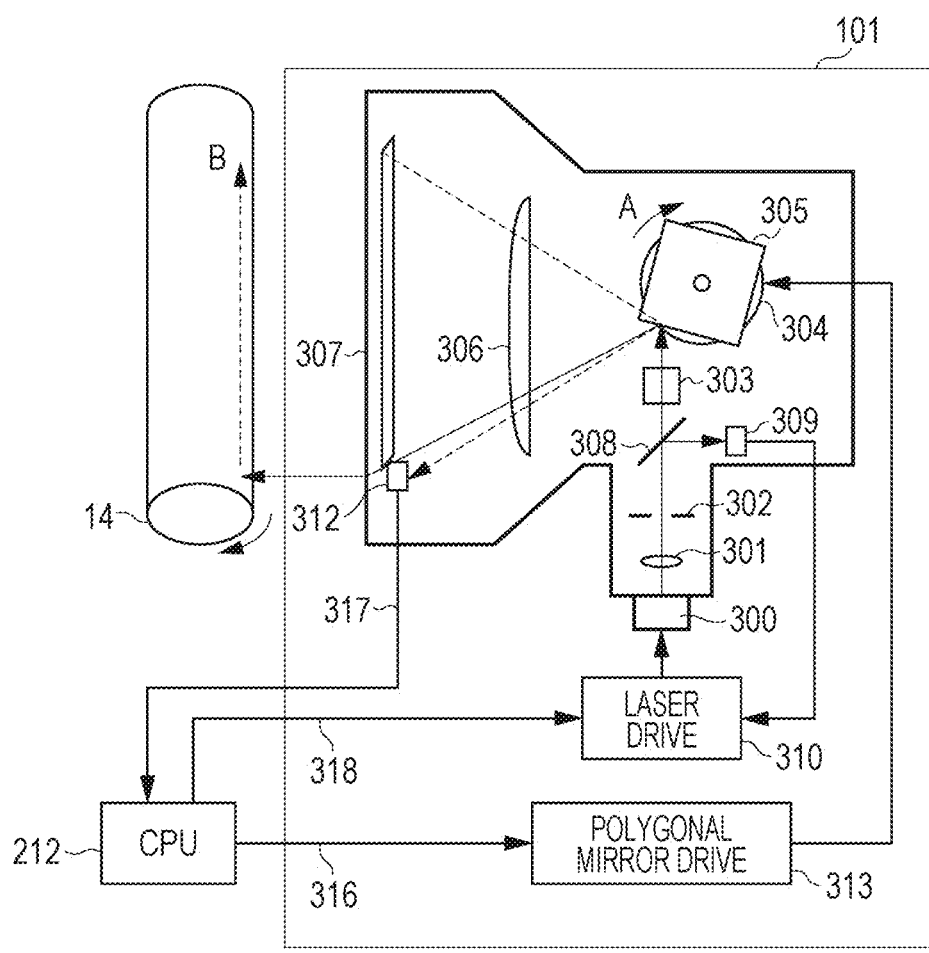
FIG. 2 is a schematic configuration diagram of an optical scanning device.

FIG. 2 is a schematic configuration diagram of one of optical scanning devices 101, 102, 103, and 104. The respective optical scanning devices have the same configuration, and hence, FIG. 2 exemplary shows the optical scanning device 101. In FIG. 2, diverged laser light emitted from a laser light source 300 is collimated by a collimator lens 301 to be substantially parallel light, and the passing amount of the laser light is limited by an aperture 302. Thus, the laser light is shaped. The laser light passing through the aperture 302 is incident on a beam splitter 308. The beam splitter 308 separates the laser light passing through the aperture 302 into laser light to be incident on a photodiode 309 (hereinafter, PD 309) and laser light directed to a rotatable polygonal mirror 305 (hereinafter, polygonal mirror 305). The PD 309 outputs a detection signal of a value corresponding to the light quantity of the laser light in response to reception of the laser light. A laser drive 310 executes feedback control for the light quantity of the laser light in accordance with the detection signal from the PD 309. The laser drive 310 is controlled for light emission with a light-emission control signal 318 from a CPU 212 (described later).

The laser light passing through the beam splitter 308 passes through a cylindrical lens 303 and is incident on the polygonal mirror 305. The polygonal mirror 303 has a plurality of reflection surfaces. The polygonal mirror 305 rotates in arrow A direction when driven by a motor 301. The polygonal mirror 305 deflects the laser light incident on the reflection surfaces so that the laser light scans the photosenstive drum 14 in arrow B direction. The laser light deflected by the polygonal mirror 305 is transmitted through an imaging optical system (fθ lens) 306 having fθ characteristics, and is guided onto the photosensitive drum 14 through a mirror 307.

The optical scanning device 101 includes a Beam Detector 312 (hereinafter, BD 312) being synchronization-signal generating means. The BD 312 is arranged in a scanning path of the laser light, at a position outside an image formation region on the photosensitive drum 14. The BD 312 generates a horizontal synchronization signal 317 when receiving the laser light deflected by the polygonal mirror 305. The horizontal synchronization signal 317 is input to the CPU 212. The CPU 212 transmits an acceleration signal or a deceleration signal being a control signal 316 in FIG. 2 to a motor drive 313 so that the horizontal synchronization signal 317 meets a reference period corresponding to a target speed of the polygonal mirror 305 and the phase relationship with respect to a polygonal mirror included in other optical scanning device becomes a predetermined phase relationship. The motor drive 313 accelerates the rotation speed of the motor 304 on the basis of the acceleration signal and decelerates the motor 304 on the basis of the deceleration signal.

Also, the CPU 212 controls an emission timing of laser light based on image data from the laser light source 300 in accordance with the horizontal synchronization signal 307. The CPU 212 includes a counter (not shown) that resets its count in response to the input of the horizontal synchronization signal 307, and starts counting a clock signal (described later) from the reset state. The CPU 212 controls an image processor (described later) and the laser drive 310 on the basis of the count value of the counter.

Figure 3:
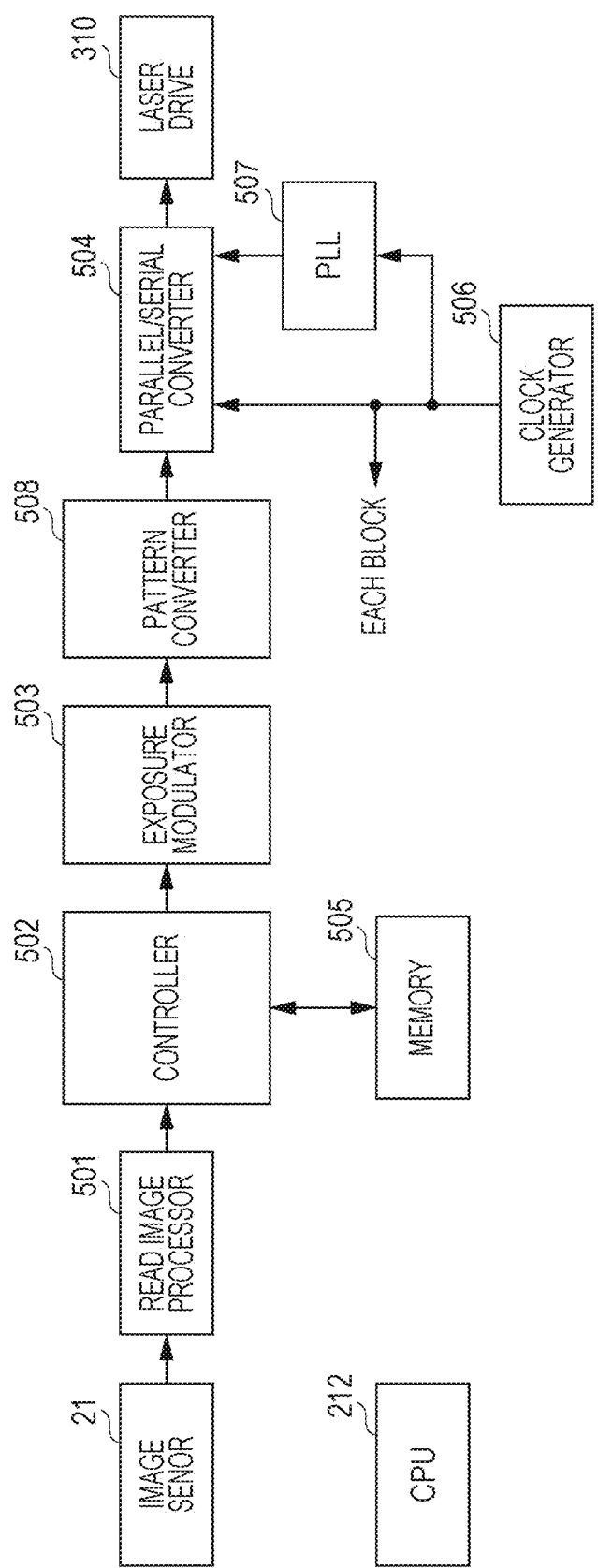
FIG. 3 is a control block diagram of an image processor and a laser drive included in the image forming apparatus according to a first embodiment.

FIG. 3 is a block diagram showing the image processor and the laser drive 310 included in the image forming apparatus according to this embodiment. The image processor shown in FIG. 3 includes a clock generator 506 that generates a clock signal. Respective blocks (described later) execute respective processing in synchronization with the clock signal. The clock signal is a signal with a higher frequency than that of the horizontal synchronization signal. A read image processor 501 receives read image data from the image sensor 21 and converts the received signal into image data corresponding to the respective colors. Also, the read image processor 501 executes conversion. processing of converting the read image data into pixel data corresponding to an output image and screen processing corresponding to the respective colors.

A controller 502 writes the image data processed by the read image processor 501 in a memory 505, reads out the written image data, and inputs the image data to an exposure modulator 503. The exposure modulator 503 processes the image data input from the controller 502 (the details are described later), and outputs the processed image data to a pattern converge 508. The pattern converter 508 converts the image data processed by the exposure modulator 503 into a bit pattern being binary data. The pattern converter 508 outputs the bit pattern (output bit data in parallel) to a parallel/serial converter 504 in synchronization with the clock signal. The clock generator 506 generates a PWM signal by outputting the bit data in serial in synchronization with a multiplied clock signal that is multiplied by a Phase Locked Loop 507 (PLL 507). The laser drive 310 controls the laser light source 300 to be lit or non-lit in accordance with the PWM signal.

Now, an exposure intensity distribution of the laser light on the photosensitive drum is described. FIG. 6(a) shows an exposure intensity distribution (hereinafter, abbreviated as exposure distribution) centered at a target pixel being a single pixel exposed to light when the surface of the photosensitive drum is exposed to light by a quantity of light corresponding to a single pixel by scanning with the laser light on the surface of the photosensitive drum. In FIG. 6(a), the horizontal axis indicates the number of pixels and the vertical axis indicates the exposure amount. FIG. 6(a) shows one-dimensional spread of the exposure distribution. The center coordinate 0 corresponds to the target pixel. Although depending on the design of the optical system, the exposure distribution has a tendency of a substantially two-dimensional gauss distribution as shown in FIG. 6(a). Also, it is found that the spread of the exposure distribution centered at the target pixel is a spread extending to several tens of pixels located around the target pixel, for example, in a system with the resolution of 2400 dpi, through the results of a simulation and an experiment.

The influence on the image frequency by the spread of the spot can be obtained as a characteristic obtained by executing Fourier transform on a spread function. FIG. 6(b) shows the characteristics obtained by Fourier transform of the waveform in FIG. 6(a). FIG. 6(b) shows the characteristics converted while the distance between pixels is assumed as 0.1. The horizontal axis indicates the spatial frequency, and the vertical axis indicates the intensity.

In contrast, in related art, correction has been provided by image processing, for example, by previously providing image processing such as high-range enhancement to decrease the influence on surrounding pixels. For example, nonlinear characteristics, such as the exposure amount, latent-image potential, and rising of laser light, have been converted with LUT 1 and LUT 2, and corrected with a two-dimensional filter using a fixed filter coefficient.

However, due to an increase in resolution of an output image, the exposure range of a single pixel has affected. surrounding pixels and the shape of the exposure spot at each position in the main-scanning direction has not been uniform. Hence, the two-dimensional filter of related art could not have provided sufficient correction.

To address such a problem, the image forming apparatus according to this embodiment corrects image data by using a correction filter (correction parameter) in the exposure modulator 503 shown in FIG. 3 to restrict unevenness of the exposure intensity distribution (potential distribution of electrostatic latent image) at each position in the main-scanning direction. The exposure modulator 503 corrects the gradation of an image by using a LUT 2001 (Look Up Table 2001), executes processing by using a two-dimensional filter, and corrects the linearity of the output of laser light caused by transient characteristics being de vice characteristics of the laser drive 310 and the laser light source 300 by using a LUT 2003 (LookUp Table 2003).

Now, the linearity of the output of the laser light caused by the transient characteristics is described. FIG. 5(a) shows input/output signals of the laser drive 310. The horizontal axis indicates the time and the vertical axis indicates the signal voltage. FIG. 5(a) shows an output waveform of laser light for the input of a PWM signal with Duty=15%, an output waveform of laser light for the input. of a PWM signal with Duty=50%, and an output waveform of laser light for the input of a PWM signal with Duty=85%. Also, reference signs T15, T50, and T85 in FIG. 5(a) indicate periods with a pulse of a PWM signal being High. Reference signs T15', T50', and T85' indicate widths of output waveforms of laser light for the inputs of the PWM signals of the pulses in T15, T50, and T85. It is to be noted that Duty represents a ratio of the period being High to the period of PHM.

As shown in FIG. 5(a), if the PWM signal with Duty=15% is input to the laser drive 310, the PWM signal is changed to Low while the output waveform of the laser light is changed to High due to the transient characteristics of the laser drive 310 and the laser light source, and hence the pulse of the output waveform of the laser light is narrowed and becomes equivalent to a dotted-line waveform (T15>T15'). If the PWM signal with Duty=85% is input to the laser drive 310, the PWM signal is changed to High while the output waveform of the laser light is changed to Low, the time width of the Low period is narrowed and becomes equivalent to a dotted-line waveform (T85<T85'). In case of Duty=50%, the pulse width is not changed even with the transient characteristics (T50=T50'). In this way, the input of the PWM signal is not proportional to Duty of the output waveform of the laser light.

The left drawing of FIG. 5(b) is a graph continuously plotting the relationship between the input of the PWM signal and the output of the laser light. The vertical axis in the left drawing of FIG. 5(b) indicates the input pulse width of the PWM signal shown in FIG. 5(a), and the vertical axis is the pulse width of the output waveform of the laser light. As shown in the left drawing of FIG. 5(b), the relationship between the input pulse width of the PWM signal and the pulse width of the output waveform of the laser light is not linear. If the relationship between the input pulse width of the PWM signal and the pulse width of the output waveform of the laser light is not linear, the linearity of the image density is decreased.

Therefore, the image forming apparatus of this embodiment ensures the linearity of the output of laser light by correcting image data by using a LUT (Look Up Table) in the right drawing of FIG. 5(b) being a correction parameter having the inverted characteristics of the left drawing of FIG. 5(b) in the LUT 2003.

Figure 4:
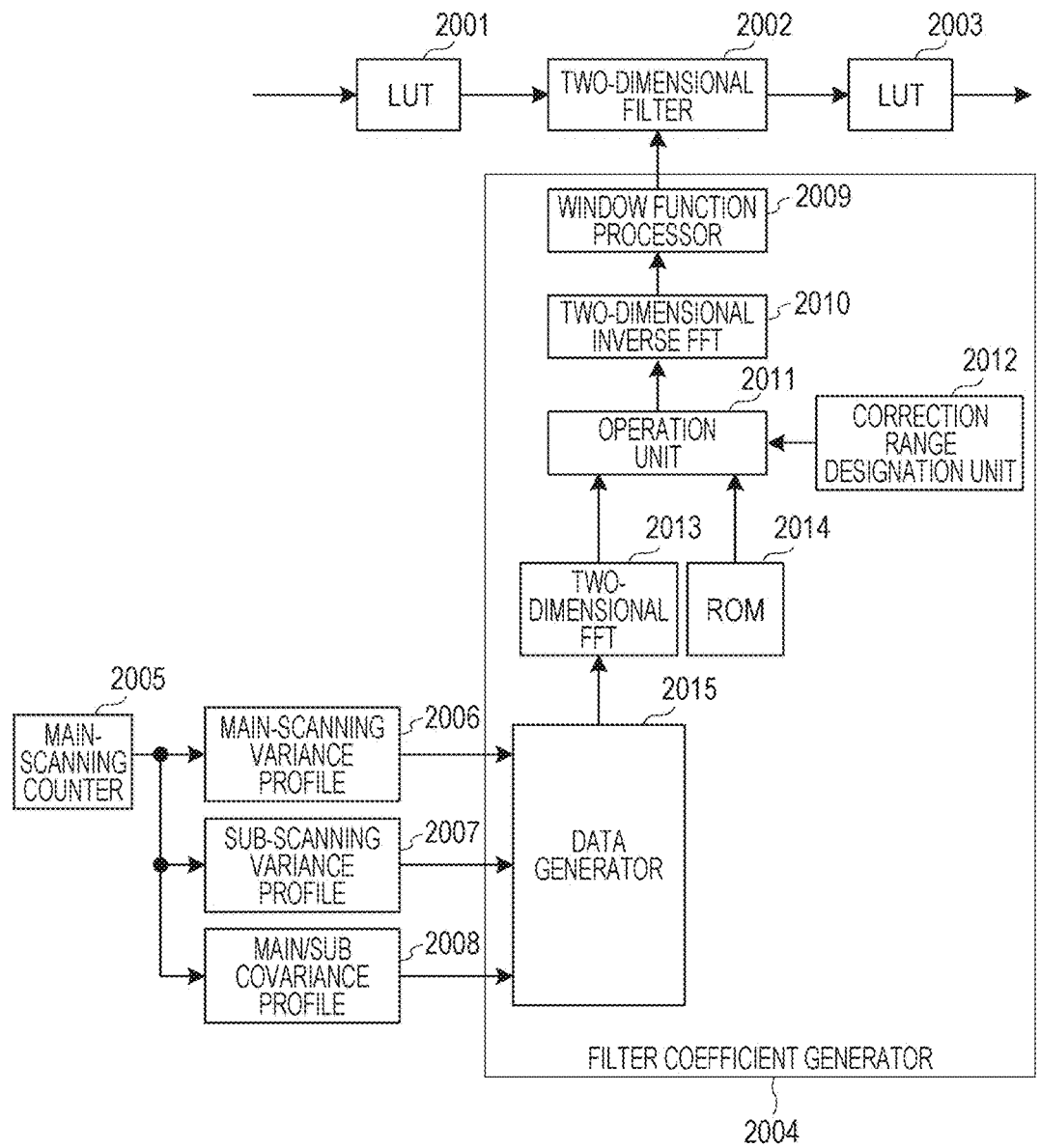
FIG. 4 is a block diagram of an exposure modulator.
Figure 7:
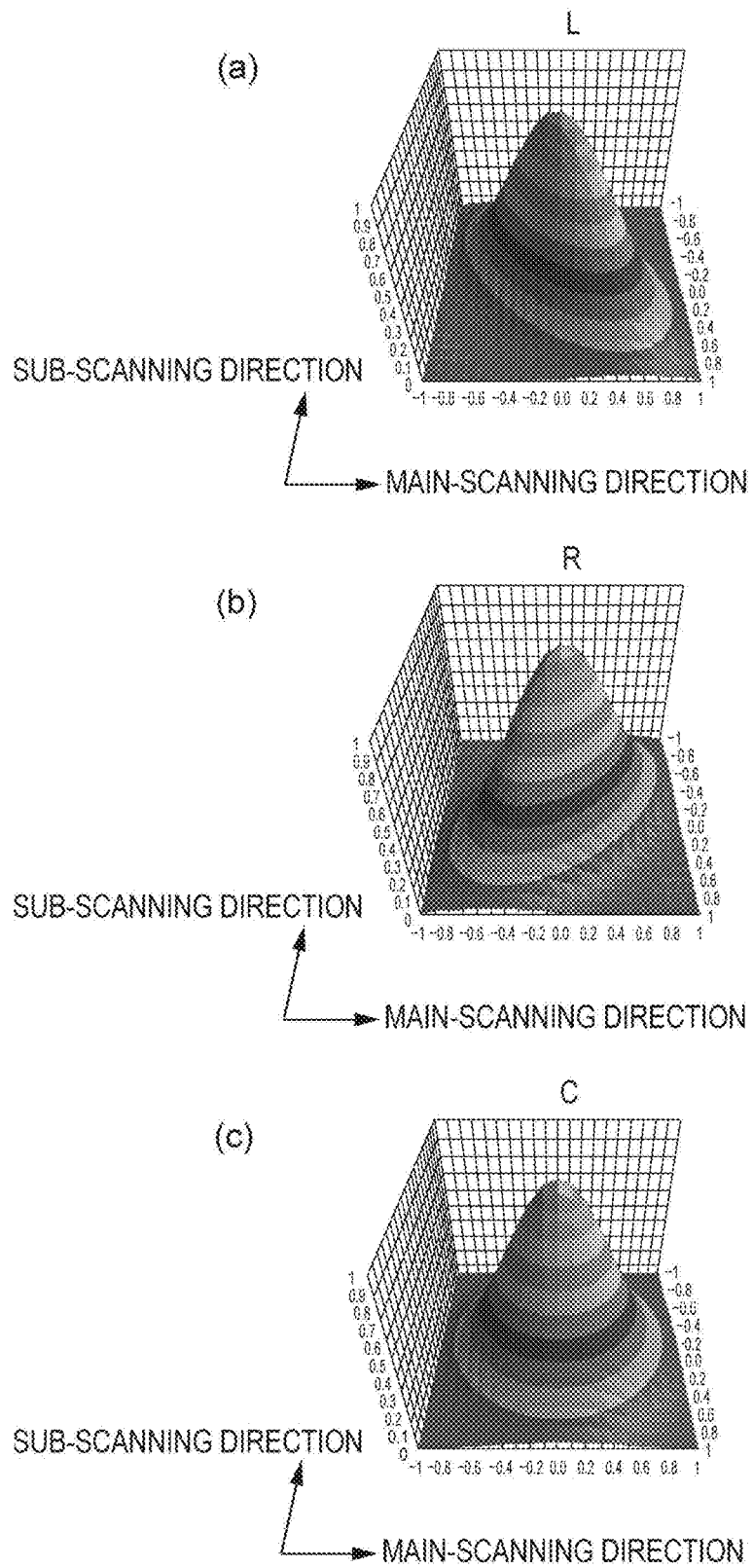
FIG. 7 illustrates exposure distribution. characteristic data.

Next, correction using a two-dimensional filter 2002 in the exposure modulator 503 is described with reference to FIGS. 4 and 7 to 11. FIGS. 4. 10, and 11 respectively show an inner configuration of the exposure modulator 503, filter coefficients (correction parameters) of a target pixel and surrounding pixels of the two-dimensional filter 2002, and an inner configuration of the two-dimensional filter 2002.

As shown in FIG. 4, image data with the gradation corrected by the LUT 2001 is input to the two-dimensional filter. The two-dimensional filter 2002 corrects image data of a target pixel by using filter coefficients respectively assigned to a target pixel k(0, 0) and surrounding pixels k(m, n) located around the target pixel at the center. FIG. 10 is a matrix of 15×15 filter coefficients indicating the filter coefficients of the target pixel k(0, 0) and the surrounding pixels k(m, n).

The image forming apparatus according to this embodiment generates filter coefficients respectively corresponding to the target pixel and the surrounding pixels as follows. The exposure modulator 503 includes a main-scanning counter 2005, a main-scanning variance profile memory 2006, a sub-scanning variance profile memory 2007, a main/sub covariance profile memory 2008, and a filter coefficient generator 2004.

The exposure distribution of laser light on the photosensitive drum in the image forming apparatus of this embodiment is determined by a variance value determined by an optical system including a lens, a mirror, and a polygonal mirror of the optical scanning device and the configuration of the apparatus. To be specific, depending on the optical system including the lens, mirror, and polygonal mirror of the optical scanning device and the configuration of the apparatus, a variance value σx (first variance value) in the main-scanning direction (hereinafter, z direction), a variance value σy (second variance value) in the sub-scanning direction (hereinafter, y direction), and a covariance value ρxy (third variance value) in the x direction and y direction are determined. The exposure distribution of laser light on the photosensitive drum is determined by the following expression.

$$f(x, y) = \frac{1}{2\pi \cdot \sigma_x \sigma_y \sqrt{1 - \rho_{xy}^2}} \exp\left(-\frac{1}{2(1 - \rho_{xy}^2)} \cdot \left(\left(\frac{x}{\sigma_x}\right)^2 + \left(\frac{y}{\sigma_y}\right)^2 - 2\rho_{xy} \cdot \left(\frac{x}{\sigma_x}\right)\left(\frac{y}{\sigma_y}\right)\right)\right)$$ [Math. 1]

Expression 1

The variance values σx and σy, and covariance value ρxy are values indicative of the exposure distribution centered at the target pixel on the photosensitive drum, and the value varies depending on a position x in the main-scanning direction. Hence, when the image forming apparatus is assembled and adjusted in the factory, variance profiles σx(x), σy(x), and ρxy(x) are generated by measuring respective variance values at respective positions in the main-scanning direction. The main-scanning variance profile σx(x) being the profile of the variance value σx in the main-scanning direction is stored in the main-scanning variance profile memory 2006. The sub-scanning variance profile σy(x) being the profile of the variance value σy in the sub-scanning direction is stored in the sub-scanning variance profile memory 2007. The covariance value profile ρxy(x) being the profile of the covariance value ρxy corresponding to both the main-scanning direction and the sub-scanning direction is stored in the main/sub covariance profile memory 2008.

The main-scanning counter 2005 is reset when receiving the input of the horizontal synchronization signal 317, and starts counting the pulse of the clock signal from the reset state. The count value of the main-scanning counter 2005 is a value indicative of the position x in the main-scanning direction. The scanning variance profile memory 2006, the sub-scanning variance profile memory 2007, and the main/sub covariance profile memory 2008 respectively output variance values corresponding to the count value of the main-scanning counter 2005, to a data generator 2015 of the filter coefficient generator 2004.

The filter coefficient generator 2004 includes the data generator 2015, a two-dimensional FFT 2013, a ROM 2014, an operation unit 2011, a correction range designation unit 2012, a two-dimensional inverse FFT 2010, and a window function 2009.

The data generator 2015 generates two-dimensional gauss distribution data of the exposure distribution of laser light on the photosensitive drum centered at the target pixel when the target pixel is exposed to light, on the basis of the variance values σx and σy, and the covariance value ρxy input in accordance with the count value of the main-scanning counter 2005. That is, the data generator 2015 generates two-dimensional gauss distribution data for every position or every ever plural blocks (regions) in the main-scanning direction, on the basis of the input variance values. The generator 2015 inputs the generated two-dimensional gauss distribution data to the two-dimensional FFT 2013. The two-dimensional FFT generates characteristic data of a spatial frequency by executing fast Fourier transform on the two-dimensional gauss distribution data input from the data generator 2015. The two-dimensional FFT inputs the characteristic data (profile) obtained through the conversion to the operation unit 2011.

FIGS. 7(a), 7(b), and 7(c) are examples of characteristic data input by the two-dimensional FFT 2013 to the operation unit 2011. In FIGS. 7(a), 7(b), and 7(c), each axis indicates the angular frequency, and the interpixel distance corresponds to 0.1. FIGS. 7(a), 7(b), and 7(c) show characteristic data by arithmetically operating the two-dimensional gauss distribution data at respective positions (L2, C, R2) on the photosensitive drum in the main-scanning direction shown in FIG. 21, into the spatial frequency. FIG. (a) shows characteristic data (DATA_1) of the exposure distribution in an end-portion region (L2) on the photosensitive drum at the scanning start side in the main-scanning direction. FIG. 7(b) shows characteristic data (DATA_C) of the exposure distribution in a center region (C) on the photosensitive drum in the main-scanning direction. FIG. 7(c) shows characteristic data (DATA_R) of the exposure distribution in an end-portion region (R2) on the photosensitive drum at the scanning end side in the main-scanning direction.

The ROM 2014 stores reference characteristic data (target characteristic data) of the exposure distribution. In the image forming apparatus of this embodiment, the exposure distribution in the center region (C) of the photosensitive drum in the main-scanning direction is assumed as an ideal exposure distribution. Hence, DATA_C is held in the ROM 2014. During image formation, the ROM 2014 outputs DATE_C to the operation unit 2011 irrespective of the count value of the main-scanning counter 2005.

The operation unit 2011 generates differential data based on the characteristic data input from the two-dimensional FFT 2013 and the reference characteristic data input from the ROM 2014. DATA_L-C shown in FIG. 8(a) is differential data obtained by subtracting DATA_C input from the ROM 2014 from DATA_L input from the two-dimensional FFT 2013. DATA_R-C shown in FIG. 8(b) is differential data obtained by subtracting DATA_C input from the ROM 2014 from DATA_R input from the two-dimensional FFT 2013. That is, DATA_L-C and DATA_R-C are data indicative of differences in exposure distribution in the respective scanning regions with respect to the exposure distribution being a target. DATA_L-C and DATA_R-C indicate that, in the exposure distribution in the end-portion region (L2) at the scanning start side in the main-scanning direction and the exposure distribution in the end-portion region (R2) at the scanning end side in the main-scanning direction, high-range characteristics at oblique portions in the short-side direction of the ellipsoidal exposure distribution rise and high-range characteristics at oblique portions in the longitudinal direction fall as compared with the exposure distribution of the center region (C) in the main scanning direction. Since the exposure distribution at the center portion of the photosensitive drum serves as the ideal exposure distribution, DATE_C-C (not shown) do not have protrusions or depressions.

Figure 8:
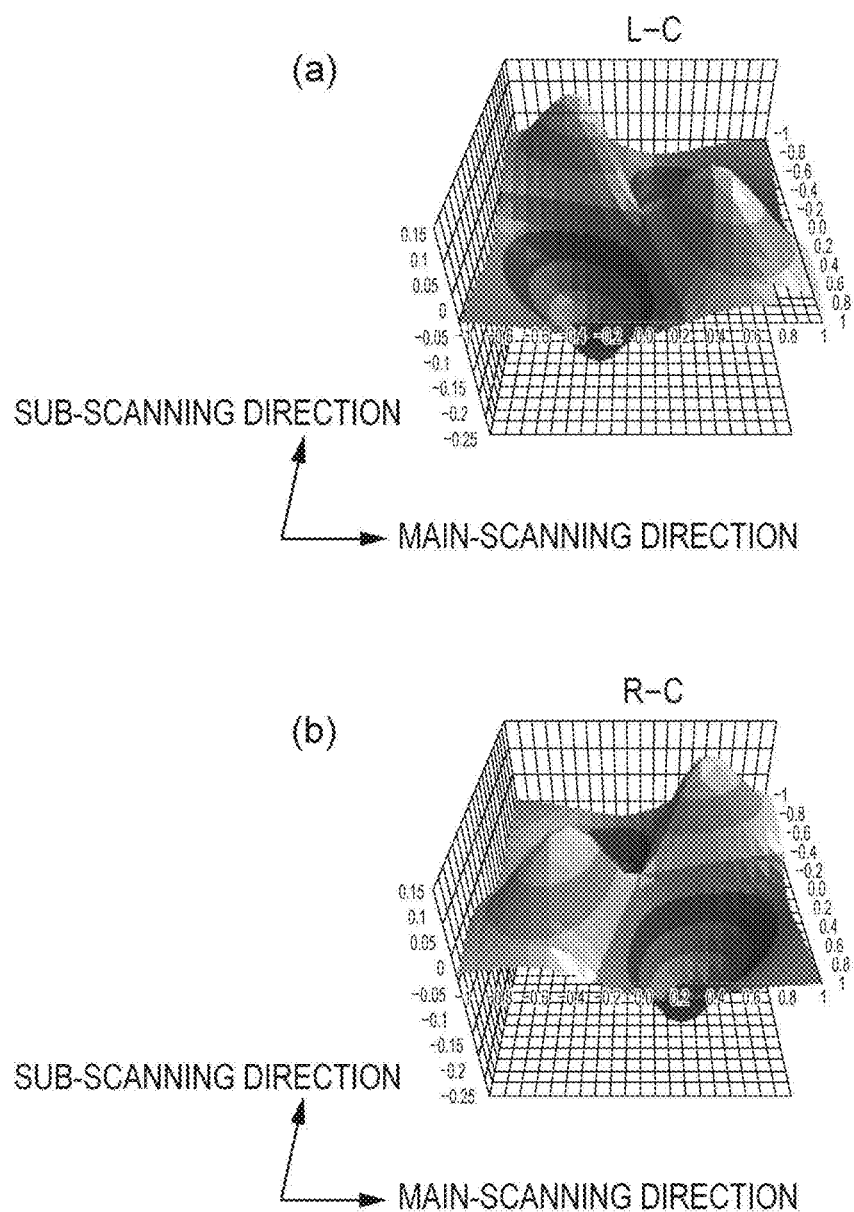
FIG. 8 illustrates differential data between the exposure distribution characteristic data and reference characteristic data.

Then, the operation unit 2011 generates correction data on the basis of DATA_L-C in FIG. 8(*a*). That is, the operation unit 2011 generates correction data to decrease the difference indicated by DATA_L-C between DATA_L and DATA_C. Similarly, the operation unit 2011 generates correction data on the basis of DATA_R-C in FIG. 8(*b*). That is, the operation unit 2011 generates correction data to decrease the difference indicated by DATA_R-C between DATA_R and DATA_C.

When Ft (ωx, ωy) is a spatial frequency characteristic of a correction object and Fr(ωx, ωy) is a spatial frequency characteristic of a reference, correction data K(ωx, ωy) is arithmetically operated by using the following functional expression.

$$K(\omega x, \omega y) = Fr(\omega x, \omega y)/Ft(\omega x, \omega y) \quad \text{Expression 2}$$

Figure 9:
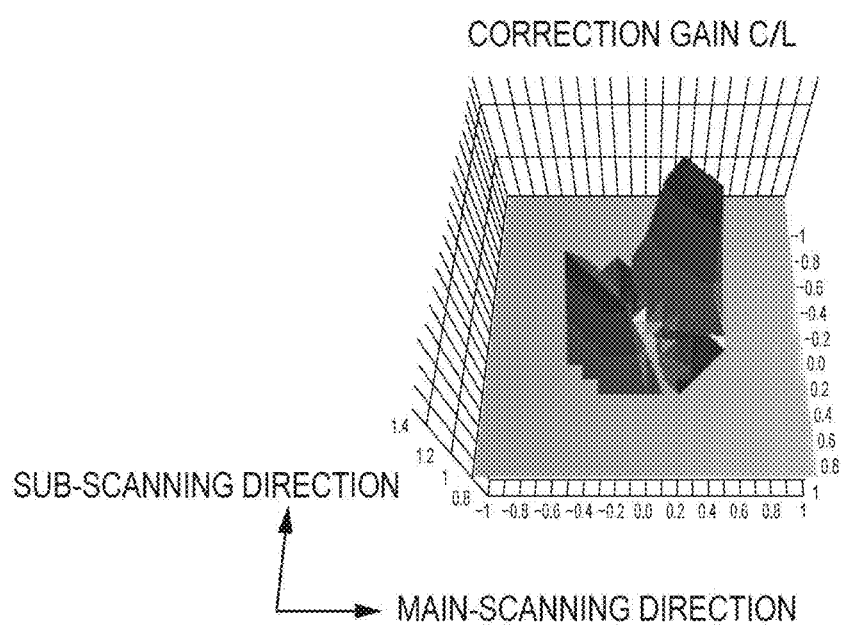
FIG. 9 is correction data generated on the basis of the differential data.

The correction range designation unit 2012 designates and holds a spatial frequency with small correction effect, and clips the designated range as a range of predetermined values. In this embodiment, the spatial frequency is clipped at 0. FIG. 9 shows an example of correction data generated on the basis of operation data in FIG. 8(*a*), clipped by the correction range designation unit 2012, and output from the operation unit 2011. The operation unit 2011 inputs the correction data (FIG. 9) obtained by the arithmetic operation to the two-dimensional inverse FFT.

The two-dimensional inverse FFT 2010 executes inverse frequency conversion on the correction data input from the operation unit 2011 and generates correction parameters (filter coefficients) respectively corresponding to the target pixel and the surrounding pixels surrounding the target pixel. FIG. 10 shows the correction parameters generated by the two-dimensional inverse FF1 2010 and respectively corresponding to the target pixel and the surrounding pixels in a matrix form. Characters k (x, y) indicates a filter coefficient. The filter coefficient of the target pixel is k(0, 0). The filter coefficients in the matrix form shown in FIG. 10 indicate the amounts of change is potential at the target pixel position caused by exposure of the surrounding pixels located around the target pixel to laser light. The exposure distribution in the image forming apparatus according to this embodiment is described as an example of correcting characteristics of a point-symmetric distribution about the target pixel. Hence, the filter coefficients k(x, y) are also point-symmetric about the target pixel. The two-dimensional inverse FFT 2010 inputs each filter coefficient k(x, y) to the window function processor 2009.

The window function processor 2009 outputs a filter coefficient kw(x, y) obtained by correcting the filter coefficient k(x, y) input from the two-dimensional inverse FFT 2010 by using a previously set window function w(x, y). this embodiment, a hamming window is set for the window function w(x, y).

$$kw(x, y) = w(x, y) * k(x, y) \quad \text{Expression 3}$$

The filter coefficient generator 2004 executes the above-described processing for each pixel, and corrects image data on the basis of the filter coefficient being correction data output from the window function processor 2009 for each pixel in the two-dimensional filter 2002. Accordingly, even if the exposure distribution is different in the main-scanning direction, the unevenness in the main-scanning direction of the exposure intensity distribution. (potential distribution of electrostatic latent image) formed on the photosensitive drum can be restricted.

Next, an inner configuration of the two-dimensional filter 2002 is described with reference to FIG. 11. The two-dimensional filter includes FIFOs (First In First Out Memories) 5001 to 5014, a shift register unit 5015, a multiplier 5016, and an adder 5017.

Figure 11:
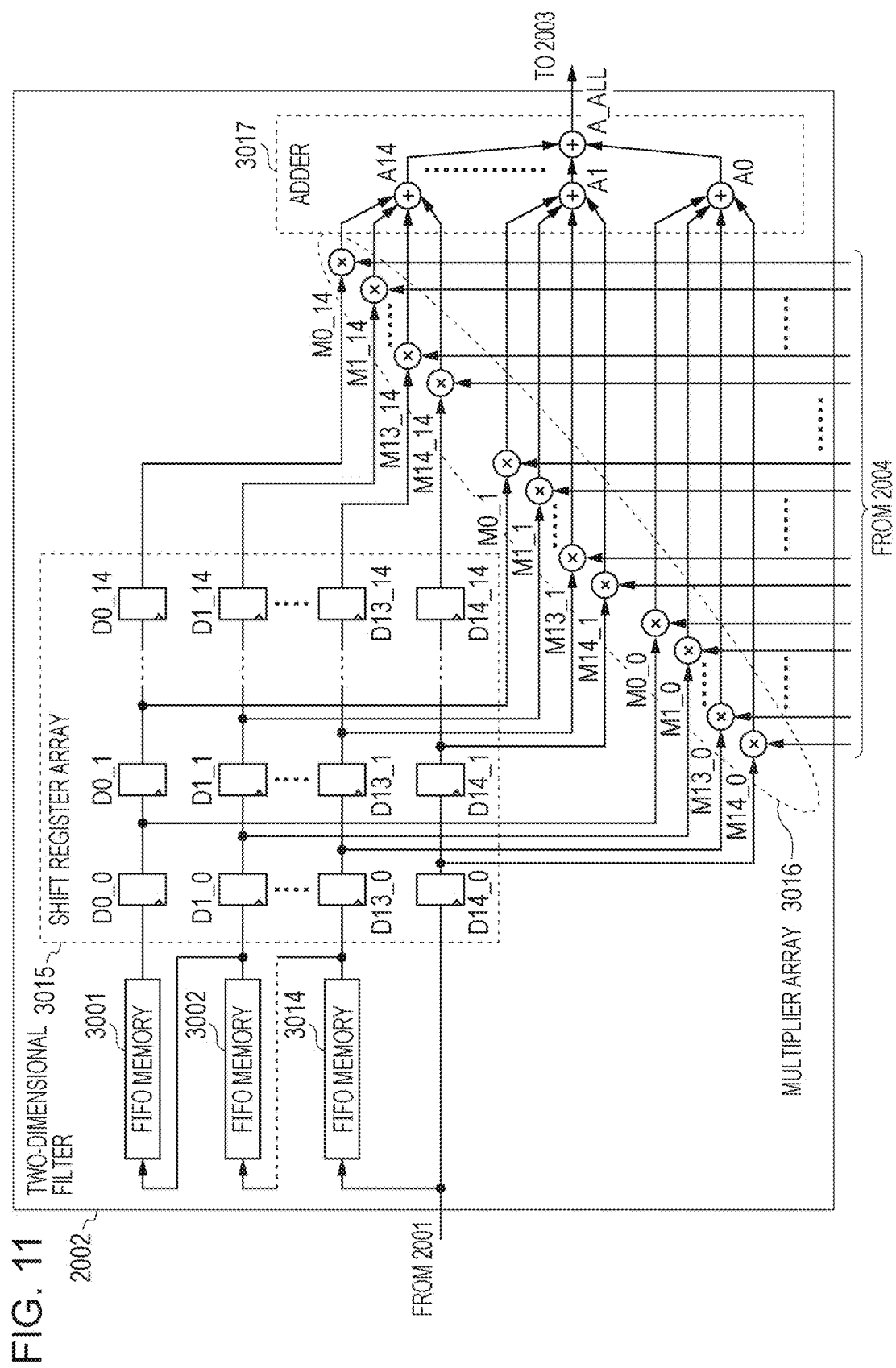
FIG. 11 is a matrix diagram of the filter coefficients.

As shown in FIG. 11, the 14 FIFOs 5001 to 5014 are connected in series, receive the input of image data from the LUT 2001 in synchronization with the image clock, and output the image data in the input order to a shift register unit 5003 in synchronization with the image clock. The FIFOs 5001 to 5014 of this embodiment serve as a line memory buffer that can store image data by the number of pixels corresponding to a single scanning period (single scanning line).

The shift register unit 5003 includes 15×15 registers. A plurality of registers D0_0 to D14_0 are assigned as shift. registers in a first stage. Shift register groups in second to fifteenth stages are similarly configured. That is, the shift register unit 5003 includes the fifteen stages of the register groups. The FIFO memory 5001 in the first stage is connected to the register D0_0 of the shift resisters in the first stage, and inputs image data (pixel data) corresponding to a single pixel to the register D0_0 in the input order. The FIFO memories in the second and later stages are respectively connected to the most upstream registers of the corresponding shift registers, and input image data (pixel data) each corresponding to a single pixel to the most upstream registers in the input order.

Also, the LUT 2001 is connected to the register 14_0 in the shift registers in the fifteenth stage. That is, the LUT 2001 inputs image data corresponding to a single pixel to the FIFO 5014 in the fourteenth stage and the register D14_0 in the shift registers in the fifteenth stage. The target pixel is data to he input to the register D7_7 in the shift register unit 5015.

A multiplier unit 5004 includes 15×15 multipliers M0_14 to M14_14. The respective multipliers are individually provided respectively for the resisters in the shift register unit 5015 in a one-to-one correspondence. The multipliers receive inputs of image data each corresponding to a single pixel from the corresponding registers. Each multiplier receives the input of the filter coefficient output from the window function processor 2009 of the filter coefficient generator 2004. Each multiplier multiplies the image data by the input filter coefficient. Then, each multiplier outputs the multiplied image data to an adder unit 3017.

The adder unit 3017 includes adders Ax: 0 to 14) and an adder A_ALL. The adders Ax add the image data corresponding to a single pixel output from each of the multipliers M0_x to M14_H. The adder A_ALL adds the outputs from the adders Ax, and outputs the result as image data of the target pixel to the LUT 2003.

In this way, by correcting the pixel data corresponding to the target pixel by the two-dimensional filter 2002 with use of the filter coefficients of the surrounding pixels, even if the exposure distribution of laser light centered at the target pixel is different depending on the exposure region (or the exposure position) in the main-scanning direction on the photosensitive drum, the potential distribution of the electrostatic latent image centered at the target pixel can be prevented from being uneven. For example, as shown in FIG. 12(*b*), the unevenness in image quality of the output image in the main-scanning direction shown in FIG. 21 can be restricted irrespective of the screen angle (or the orientation of thin lines).

Second Embodiment

In this embodiment, a configuration that corrects image data, the configuration which is different from the second embodiment, is described. The configuration other than the exposure modulator is the same, and hence the description for the configuration other than the exposure modulator is omitted.

FIG. 13 shows a control block diagram of an image forming apparatus according to this embodiment. A ROM 1303 stores filter coefficients corresponding to respective positions (or respective regions) in the main-scanning direction. The filter coefficients are filter coefficients in a matrix centered at a target pixel and respectively correspond to the target pixel and surrounding pixels data reading unit 1302 reads out the filter coefficients in the matrix corresponding to the respective positions in the main-scanning direction from the ROM 1303 and writes the filter coefficients in a register in a two-dimensional filter 1301, on the basis of the count value of the main scanning counter 2005. The two-dimensional filter 1301 executes operation processing on image data of the target pixel in accordance with the matrix coefficients, and generates the image data of the respective pixels.

Next, the operation processing executed by the two-dimensional filter 1301 is described. The two-dimensional filter 1301 includes a first operation processor 1304 and a second operation processor 1305.

First operation processing executed by the first operation processor 1304 is described first. By changing weighting of the exposure amounts of the target pixel and its surrounding pixels in accordance with the spot, shape at the target position, the exposure distribution based on the image data of the target pixel is prevented from being uneven irrespective of the difference in spot shape at each position in the main-scanning direction. As illustrated, the first operation processor 1301 obtains matrix coefficients $M(a)=\{M(a)_{11}, M(a)_{12}, M(a)_n, M(a)_{21}, M(a)_{22}, M(a)_{23}, M(a)(a) M(a)_{32} M(a)_{33}\}$, and first operation result $\{_{11}, a_{12}, a_n, a_{21}, a_{22}, a_{23}, a_{33}, a_{33}, a_{33}\}$ which are obtained by integrating density data I(a) of a target pixel a. An operation expression of the first operation processing executed by the first operation processor is provided below.

First operation result=$I(a) \times M(a)=\{I(a) \times M(a)_{11}, I(a) \times M(a)_{12}, I(a) \times M(a)_{13}, I(a) \times M(a)_{21}, I(a) \times M(a)_{22}, I(a)=M(a)_{23}, I(a) \times M(a)_{31}, I(a) \times M(a)_{32}, I(a) \times M(a)_{33}\}$   Expression 4

Figure 14:
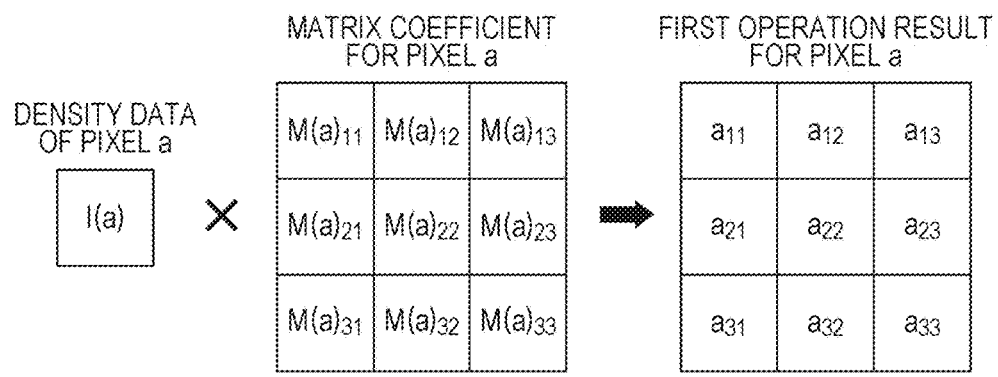
FIG. 14 is a matrix diagram of filter coefficients.

FIG. 14 shows the operation result for the pixel a after the operation processing. For example, as shown in FIG. 21(b), for a position like the end-portion region (L2) in the main-scanning direction at which the spot shape of laser light is thin and long from the upper left toward the lower right, filter coefficients are set to correct image data so that the exposure amounts of surrounding pixels at the lower left and upper right with respect to the target pixel are increased as compared with the case without the correction using the filter coefficients. In contrast, for a position like the end-portion region (R2) in the main-scanning direction at which the spot shape of laser light is thin and long from the lower left toward the upper right, filter coefficients are set to correct image data so that the exposure amounts of surrounding pixels at the upper left and lower right are increased as compared with the case without the correction using the filter coefficients. It is to be noted that the first operation processing is executed on all pixels of a processing object image as shown in FIG.

The matrix coefficients used here are previously designed, for example, at adjustment in the factory, and stored in the ROM 1303. FIG. 16(a) shows an example of the filter coefficients in the matrix stored in the RPM 1303. At the time of shipment from the factory, CODs are arranged at positions corresponding to the surface of the photosensitive drum, or at a plurality of positions (longitudinal direction) in the main-scanning direction (the longitudinal direction of the photosensitive drum) by a number n (n is a natural number) of points, and the spot shape of laser light is measured at the plurality of positions. Then, matrix coefficients $\{M(pi)_{11}, M(pi)_{12}, M(pi)_{13}, N(pi)_{21}, M(pi)_{22}, (pi)_{23}, N(pi)_{31}, N(pi)_{32}, N(pi)_{33}\}$ corresponding to the measurement result at measurement positions pi (i is integers from 1 to n) in the main-scanning direction are calculated, and the matrix coefficients are stored in the memory 1303 in association with the measurement positions Pi. The filter coefficients shown in FIG. 16 represent amounts of change in potential at pixel positions of the surrounding pixels surrounding the target pixel caused by exposure of the target pixel to light. It is to be noted that the measurement positions pi are values corresponding to the count value of the main-scanning counter.

In the first operation processing, the matrix coefficients corresponding to the longitudinal position of the target pixel are selected, and integral processing is executed with density data. In this case, according to this embodiment, while the operation is executed by using 3×3 matrix coefficients, the matrix size is determined to attain an effect for the resolution and the spot size. FIGS. 16(b) and 16(c) each show the relationship between the resolution (pixel interval) and the spot size. If the spot size is large with respect to the pixel interval as shown in FIG. 16(b), a plurality of spots overlap each other. In this case, by increasing the matrix size and executing an operation on pixels including adjacent pixels and pixels next to the adjacent pixels, the light quantity distribution can be corrected for a change in shape of a larger spot. Also, if spots on only pixels adjacent to the target pixel overlap each other, spots on the pixels next to the adjacent pixels do not affect the light quantity distribution of the target pixel. Hence, 3×3 matrix coefficients are used. As shown in FIG. 16(b), if the spot size is substantially equivalent to the pixel interval, even though the light quantities of the adjacent pixels are adjusted, the adjustment less affects the light quantity distribution of the target pixel. Hence, the effect is small with the technique in this embodiment. Also, if the matrix size is increased, a memory is required for storing density data of surrounding pixels used for the operation. The operation amount is increased, and therefore the circuit scale is increased. Owing to this, the matrix size is desirable to be so small that the correction of the light quantity distribution is effective.

Figure 15:
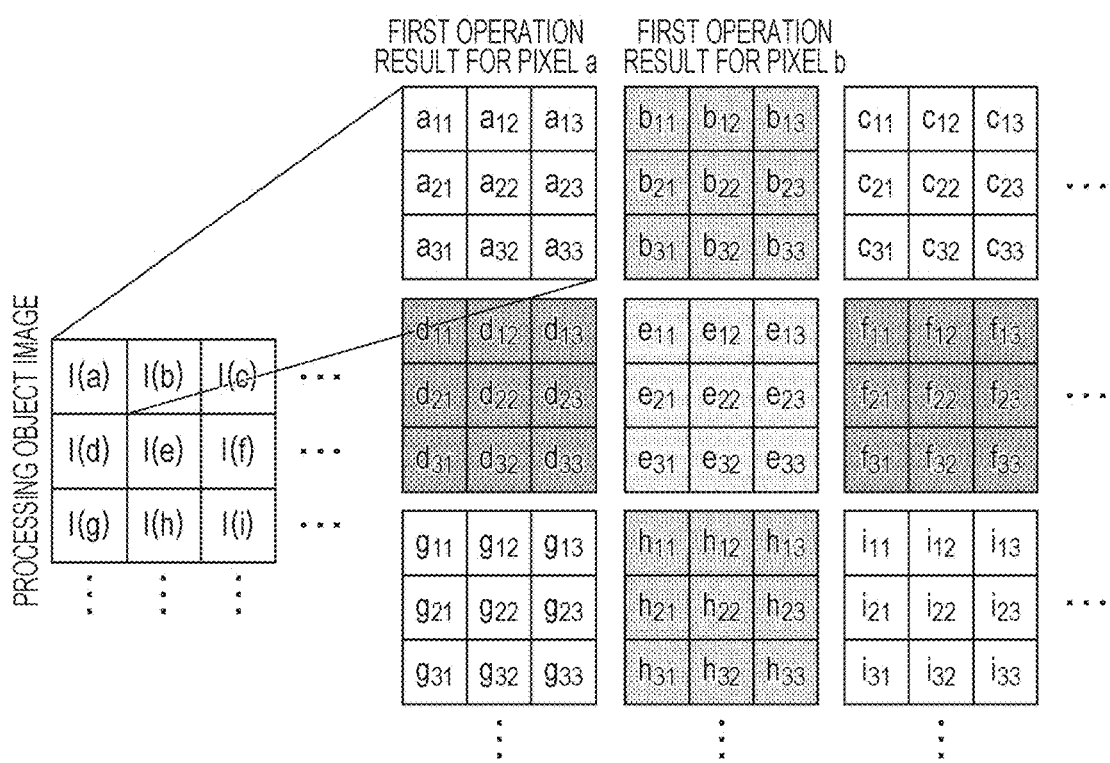
FIG. 15 is a conceptual diagram of a first operation.
Figure 17:
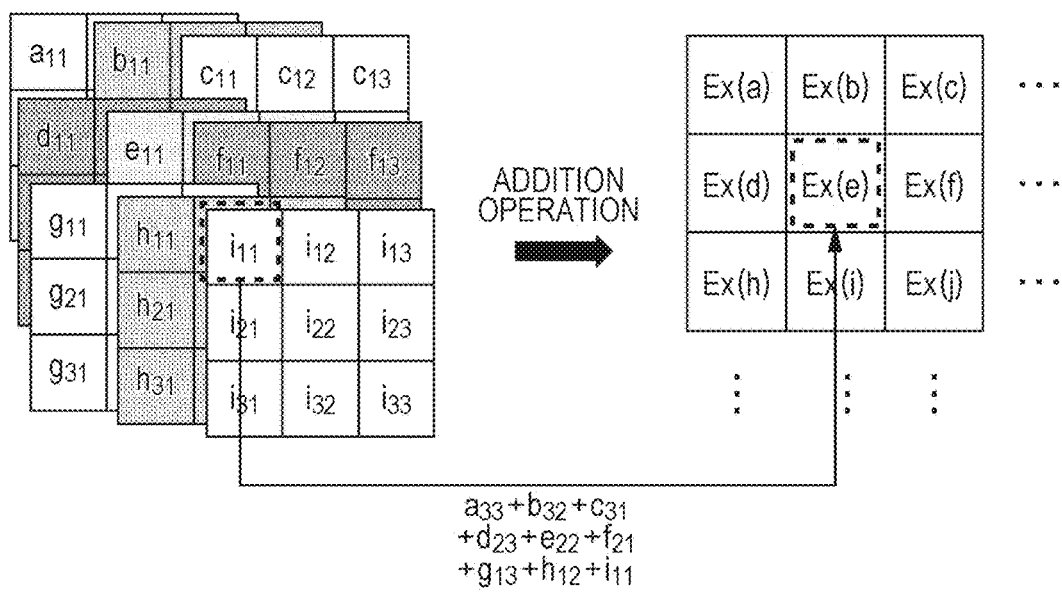
FIG. 17 is a conceptual diagram of a second operation.

Next, the second operation processing executed by the second operation processor 1305 is described with reference to FIG. 17. For example, when a pixel e is a target pixel, image data $e_{22}$ for the pixel e is generated as shown in FIG. 15 by the first operation processing. Also, when pixels e are surrounding pixels, image data $a_{33}, b_{32}, c_{31}, cl_{73}e_{22}, f_{21}, g_{13}, h_{12}, i_{11}$ are generated for the pixels e. The second operation processor 1305 executes an operation as follows as the second operation processing to obtain image data Ex (e) for the pixel e.

$$\text{Ex}(e) = a_{33} + b_{32} + c_{31} + d_{23} + e_{22} + f_{21} + g_{13} + h_{12} + i_{11} \quad \text{Expression 5}$$

The second operation processor 1305 executes the second operation processing in Expression 5 on all pixels. Image data obtained for all pixels by the second operation processing is output to the LUT 2003.

By switching the filter coefficients in accordance with the exposure position in the main-scanning direction and correcting the image data of the surrounding pixels, even if the spot shape of laser light on the photosensitive drum in the main-scanning direction is not uniform, the unevenness of the exposure amount distribution in the main-scanning direction can be restricted.

The configuration that obtains a result equivalent to the aforementioned exposure amount setting processing can be realized by filter processing. This filter processing is also included in the scope of the invention. The filter processing is described in detail. When Expression 5 that calculates the second operation result Ex(e) for a pixel e is deformed, the following expression is derived.

$$\mathrm{Ex}(e) = a_{33} + b_{32} + c_{31} + d_{23} + e_{22} + f_{21} + g_{13} + h_{12} + i_{11} = I(a) \times M(a)_{33} + I(b) \times M(b)_{32} + I(c) \times M(c)_{31} + I(d) \times M(d)_{23} + I(e) \times M(e)_{22} + I(f) \times M(f)_{21} + I(g) \times M(g)_{13} + I(h) \times M(h)_{12} + I(i) \times M(i)_{11}$$

Expression 6.

This is filter processing that uses a filter $\{M(a)_{33}, M(b)_{32}, M(d)_{31}, M(d)_{23}, M(e)_{22}, M(f)_{21}, M(g)_{13}, M(h)_{12}, M(i)_{11}\}$, and calculates the linear sum of density data $\{I(a), I(b), I(c), I(d), I(e), I(f), I(g), I(h), I(i)\}$ of the target pixel and the surrounding pixels.

Also, in this embodiment, the exposure amount is controlled by changing the lighting pulse width of the laser, that is, the emission time; however, it is not limited thereto. For another example, the exposure amount may be controlled by changing the light quantity of laser light, that is, the emission intensity (this may be also applied to the first embodiment).

Also, in this embodiment, correcting the shape of the combined light quantity distribution at a set of pixels including a target pixel and its surrounding pixels into a desirable shape is the purpose of processing; however, the purpose of processing is not limited thereto. For another example, the purpose of processing may be correcting the gravity center position of the combined light quantity distribution at a set of pixels including a target pixel and its surrounding pixels into a desirable position. Accordingly, unevenness in image quality which may occur when the shift amount of the imaging position is different depending on the longitudinal position.

Third Embodiment

This embodiment relates to a technique of setting the exposure amount of each pixel on the basis of the previously measured spot shapes at plural longitudinal positions similarly to the second embodiment. In particular, a point different from the second embodiment is described in detail.

Figure 19:
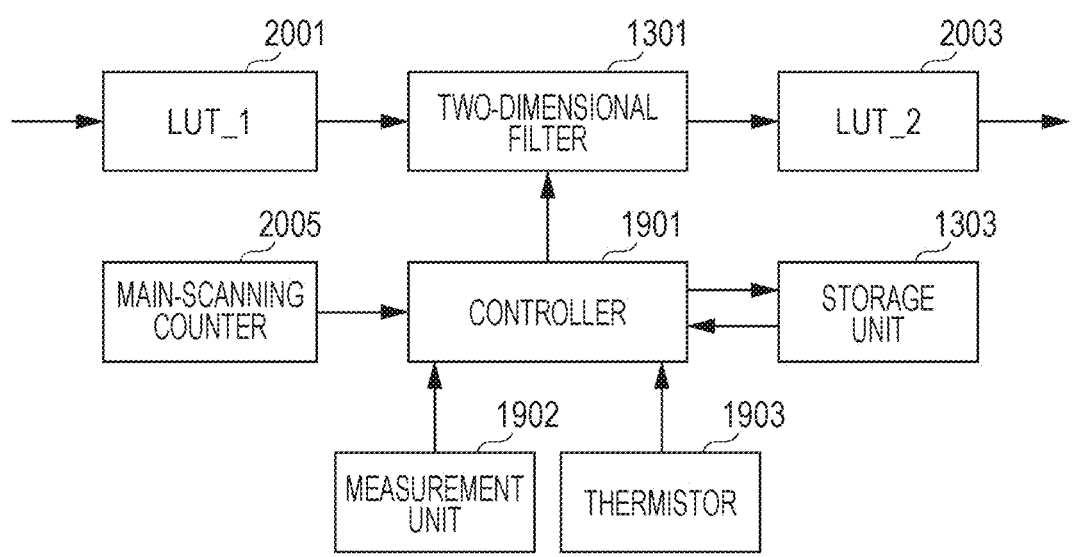
FIG. 19 is a control block diagram of an image processor included in an image forming apparatus according to a third embodiment.

In this embodiment, when the spot shape varies with a temperature change in the apparatus, proper correction is made in accordance with the temperature. Members configuring optical scanning devices 101, 102, 103, and 104 are expanded (or contracted) due to a temperature change. Then, the optical path length until laser light reaches the surface of the photosensitive drum is changed, and defocusing may occur. At this time, as shown in FIG. 18, the spot shape is changed in accordance with the defocusing amount. As the defocusing is increased, the light intensity at the spot center is decreased and simultaneously the light intensity in the surrounding portion is increased. Hence, the change in spot shape becomes wide and defocused. To correct the change in spot shape due to the temperature change, matrix coefficients corresponding to the spot shape when the temperature is changed are stored in the memory, the inside temperature is measured by a measurement unit provided in the apparatus, and the matrix coefficients corresponding to the respective longitudinal positions are set in accordance with the temperature change. FIG. 19 shows a block diagram of a configuration including a thermistor 1903 in the apparatus. The thermistor 1903 detects the inside temperature. A controller 1901 monitors the inside temperature at image formation. If the temperature is changed to a predetermined value, the matrix coefficients corresponding to the temperature are set on a laser basis.

Figure 20:
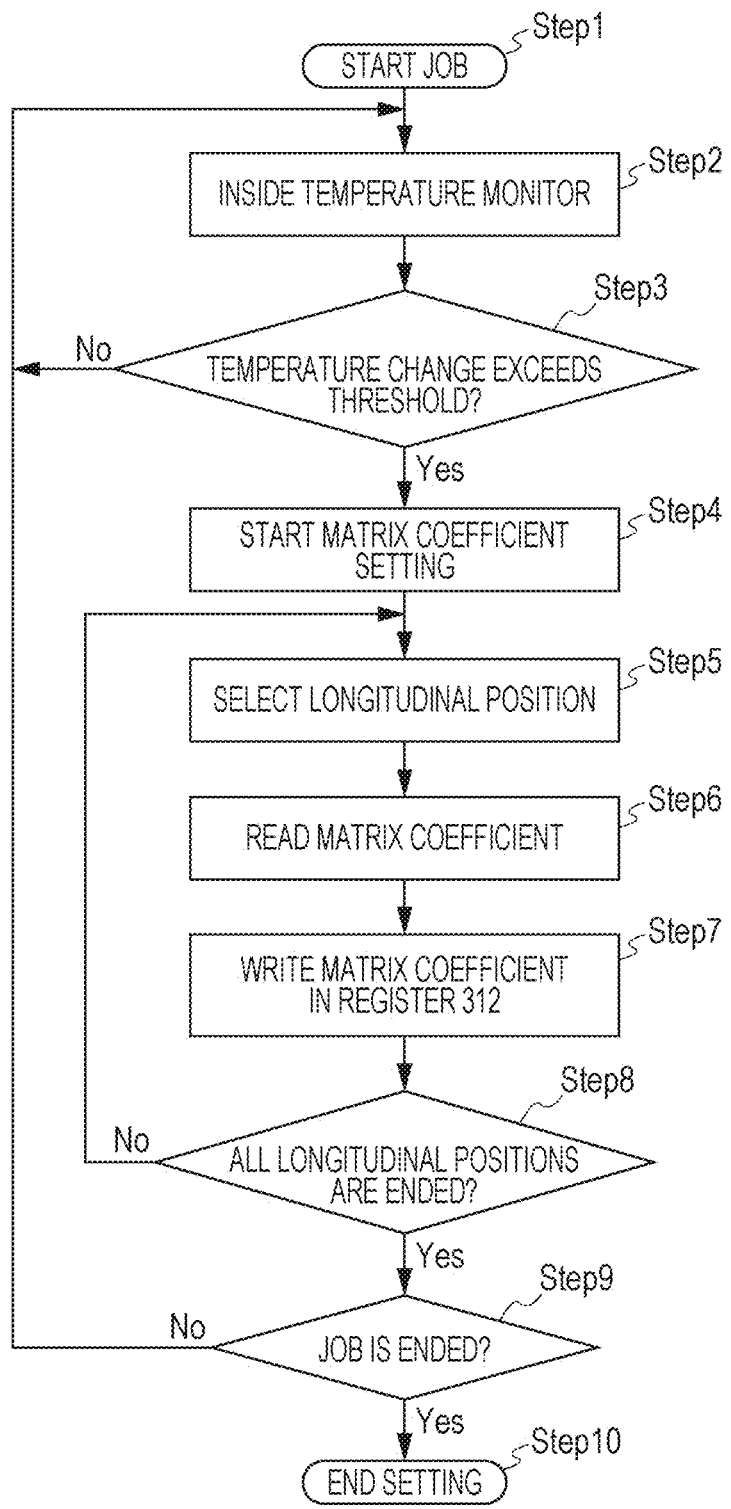
FIG. 20 is a control flow executed in the image forming apparatus according to the third embodiment.

The operation of the controller 1903 is described. Similarly to the second embodiment, it is assumed that initial matrix coefficients are written in the register of the first operation unit 1304 shown in FIG. 13(*b*) immediately after the power supplied. Further, during a continuous job, the inside temperature is repetitively monitored, and if a temperature change by a certain degree or more is made, the matrix coefficients written in the register are updated. The operation of the controller during continuous job is shown in FIG. 20. In Step 1, when start of a print job is instructed, the controller 1901 starts monitoring the temperature. The controller 1901 monitors the output from the thermistor 1903 in Step 2, and determines whether or not the temperature change since previous monitoring exceeds a predetermined threshold in Step 3. In Step 3, if it is determined that the temperature change does not exceed the predetermined threshold, the controller 1901 shifts the control to monitoring of the inside temperature in Step 2 after a predetermined time interval elapses. If it is determined that the temperature change exceeds the predetermined threshold in Step 3, the controller 1901 starts setting filter coefficients in a matrix in Step 4. In Step 5, the controller 1901 determines the longitudinal position on the basis of the count value of the main-scanning counter. In Step 6, the controller 1901 reads out the matrix coefficients based on the determination result in Step 5 from the memory. An address corresponding to each position in each main-scanning direction is assigned to the ROM 1303, and filter coefficients in a matrix corresponding to the inside temperature is stored in association with the address. The controller 1901 reads out the filter coefficients in the matrix corresponding to the temperature detected by the thermistor 1901 and the longitudinal position in Step 6, and writes the read filter coefficients in the matrix in the register in Step 7. In Step 8, the controller 1901 determines whether or not setting for all longitudinal positions is ended. If it is determined that setting is ended, the control is advanced to Step 9 in Step 9, the controller 1901 determines whether or not the job is ended. If the job is not ended (the job is continued), the control is shifted to monitoring of the inside temperature in Step 2. If it is determined that the lob is ended in Step 8, the controller 1901 ends the setting operation for the filter coefficients in the matrix.

In this embodiment, similarly to the second embodiment, filter coefficients in a matrix are stored in the ROM 1301 in accordance with the spot shape at each longitudinal position previously measured at adjustment in the factory. Also, a change in spot with respect to a change in inside temperature is previously measured, the filter coefficients in the matrix are stored in association with the temperature. The image forming apparatus according to the third embodiment can correct the change in spot shape due to the change in inside temperature, in addition to the variation in spot shape at the longitudinal position in an initial phase as compared with the first and second embodiments.

In this embodiment, the filter coefficients in the matrix are set in accordance with the detection result of the inside temperature. However, the detection object is not limited to the inside temperature. For example, the inside humidity or inside atmospheric pressure may be measured by a measurement unit 1902. For another example, the position, posture, speed, temperature, electric resistance, charge amount, drive current, drive timing, etc., of any one of the members configuring the image forming apparatus may be a detection object.

The present invention is not limited to the above-described embodiments, and various changes and modifications can be made without departing from the spirit ant scope of the present invention. Therefore, the following claims are attached for making the scope of the present invention in public.

The invention claimed is:

1. An image forming apparatus, comprising:
    a light source configured to emit light beam for exposing a photosensitive member to light;
    a deflecting unit configured to deflect the light beam so that the light beam scans the photosensitive member;
    an optical unit configured to guide the light beam deflected by the deflecting unit to the photosensitive member;
    a data generating unit configured to generate pixel data corresponding to each pixel included in an output image;
    an outputting unit configured to output correction data for correcting a potential distribution of an electrostatic latent image centered at a target pixel formed on the photosensitive member due to a change of an exposure spot shape of the light beam on the photosensitive member is a scanning direction in which the light beam scans the photosensitive member,
    wherein the outputting unit outputs the correction data for pixel data of the target pixel based on pixel data of surrounding pixels located around the target pixel, the correction data being set for each of a plurality of regions of the photosensitive member in the scanning direction, the outputting unit switching the correction data outputted depending on the position of the target pixel in the scanning direction;
    a correcting unit configured to correct pixel data of the target pixel on the basis of the correction data and a plurality of pixel data of the surrounding pixels surrounding the target pixel by using a two dimensional filter; and
    a control unit configured to control the light source on the basis of the pixel data of the target pixel corrected by the correcting unit, to form the target pixel.

2. The image forming apparatus according to claim 1, wherein the outputting unit includes a storage unit configured to store the correction data corresponding to a position in the scanning direction.

3. The image forming apparatus according to claim 1, further comprising:
    a storage unit configured to a first variance value indicative of a potential distribution of the electrostatic latent image centered at the target pixel in the scanning direction, a second variance value indicative of a potential distribution of the electrostatic latent image centered at the target pixel in a rotation direction of the photosensitive member, and a third variance value indicative of a potential distribution of the electrostatic latent image centered at the target pixel in both the scanning direction and the rotation direction; and
    a correction-data generating unit configured to generate the correction data on the basis of the first variance value, the second variance value, and the third variance value.

4. The image forming apparatus according to claim 1, wherein the correction parameter includes a parameter corresponding to the target pixel and a plurality of correction parameters corresponding to the surrounding pixels, the correcting unit correcting the image data on the basis of the two-dimensional filter output from the output unit in accordance with a position of the target pixel in the scanning direction.

5. The image forming apparatus according to claim 1, further comprising:
    a synchronization-signal generating unit configured to receive the light beam deflected by the deflecting unit, and generating a synchronization signal in response to the reception of the light beam;
    a clock-signal generating unit configured to generate a clock signal being a signal with a higher frequency than a frequency of the synchronization signal; and
    a counter configured to count the clock signal,
    wherein a count value of the counter is a value corresponding to the position in the scanning direction, and
    wherein the outputting unit outputs correction data corresponding to the count value on the basis of the count value of the counter.

* * * * *